(12) United States Patent
Fukuyama

(10) Patent No.: US 7,643,209 B2
(45) Date of Patent: Jan. 5, 2010

(54) MICROSCOPE OPTICAL SYSTEM, MICROSCOPE APPARATUS, AND MICROSCOPE OBSERVATION METHOD

(75) Inventor: Hiroya Fukuyama, Machida (JP)

(73) Assignee: Olympus Corporation, Tokyo (JP)

( * ) Notice: Subject to any disclaimer, the term of this patent is extended or adjusted under 35 U.S.C. 154(b) by 147 days.

(21) Appl. No.: 11/830,587

(22) Filed: Jul. 30, 2007

(65) Prior Publication Data

US 2008/0030849 A1 Feb. 7, 2008

(30) Foreign Application Priority Data

Aug. 2, 2006 (JP) ............................. 2006-211032
Mar. 13, 2007 (JP) ............................. 2007-063824

(51) Int. Cl.
*G02B 21/02* (2006.01)
(52) U.S. Cl. ..................................................... 359/381
(58) Field of Classification Search .................. 359/381
See application file for complete search history.

(56) References Cited

U.S. PATENT DOCUMENTS

| 7,209,292 | B2 * | 4/2007 | Epple et al. | 359/649 |
| 2001/0003488 | A1 * | 6/2001 | Yoshida | 359/381 |
| 2005/0128573 | A1 * | 6/2005 | Merz | 359/381 |
| 2006/0012860 | A1 * | 1/2006 | Bender | 359/381 |
| 2006/0152799 | A1 * | 7/2006 | Ri | 359/368 |

FOREIGN PATENT DOCUMENTS

JP 2002031758 1/2002

* cited by examiner

*Primary Examiner*—Joshua L Pritchett
(74) *Attorney, Agent, or Firm*—Pillsbury Winthrop Shaw Pittman, LLP

(57) ABSTRACT

The present invention enables switching between wide-field observation and high-magnification observation during in vivo examination of a small laboratory animal or the like using a narrow-diameter objective lens, without changing the objective lens. There is provided a microscope optical system including an objective lens for collecting light from an examination target; an image-forming lens for imaging the light collected by the objective lens onto a detection device; and an auxiliary optical system, having positive power, which is provided so as to be capable of being inserted in and removed from a light path between the objective lens and the image-forming lens.

4 Claims, 37 Drawing Sheets

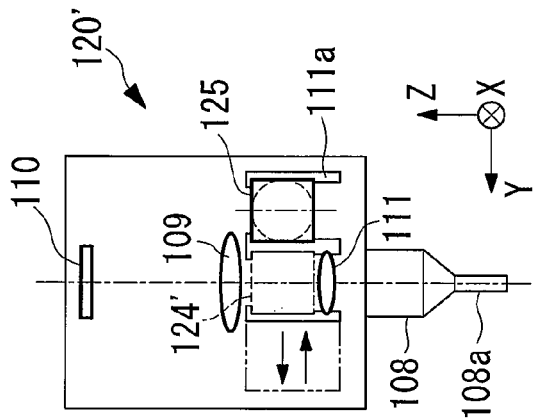
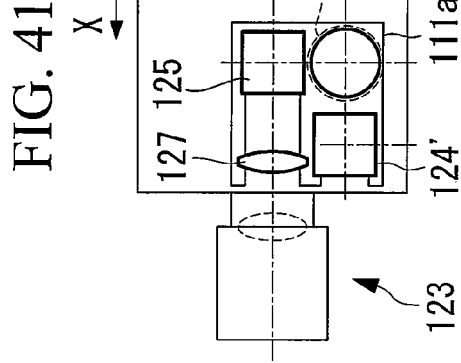
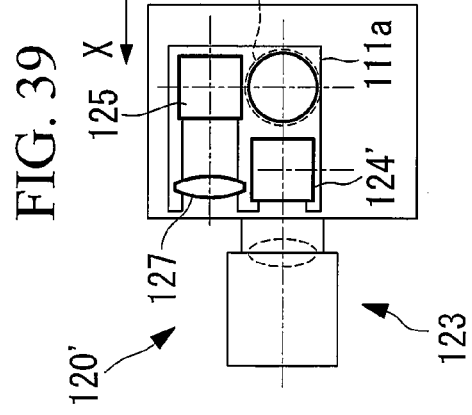
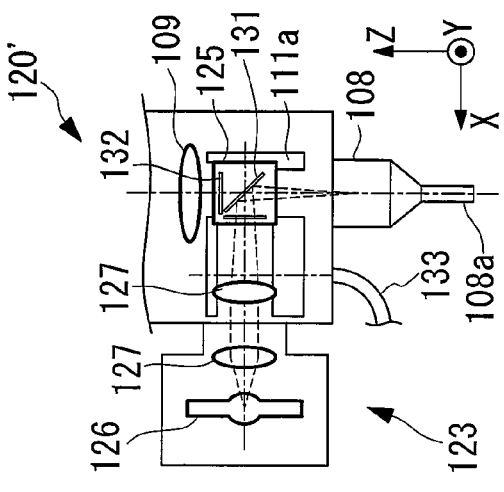
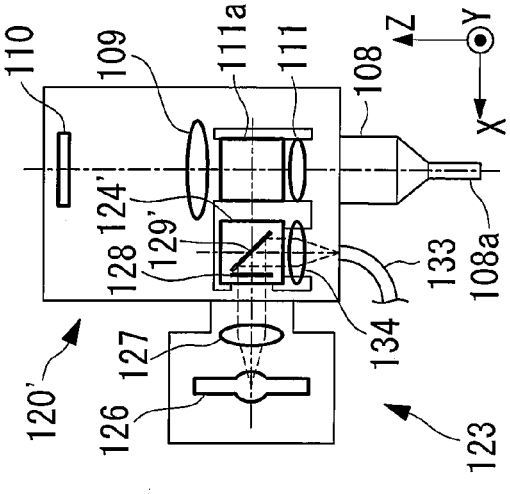

MICROSCOPE OPTICAL SYSTEM, MICROSCOPE APPARATUS, AND MICROSCOPE OBSERVATION METHOD

BACKGROUND OF THE INVENTION

1. Field of the Invention

The present invention relates to microscope optical systems, microscope apparatuses, and microscope observation methods. More particularly, the present invention relates to a microscope optical system, a microscope apparatus, and an observation method for in vivo examination of the interior of a small laboratory animal or the like.

This application is based on Japanese Patent Applications, Nos. 2006-211032 and 2007-063824, the content of which is incorporated herein by reference.

2. Description of Related Art

In a known microscope in the related art, by magnifying the center of the field of view of an objective lens, it is possible to perform observation with a low magnification over a wide field of view and observation with high magnification and high resolution, without changing the objective lens (for example, see Japanese Unexamined Patent Application, Publication No. 2002-31758.

In order to perform in vivo examination of the inside of a small laboratory animal or the like, it is necessary to make an incision small enough that it does not injure the small laboratory animal and to insert an objective lens with as narrow a diameter as possible.

However, if the diameter of the objective lens is reduced, the field of view becomes narrow, resulting in the drawback that it is not possible to perform observation over a wide field of view, even with a magnifying optical system like that in Japanese Unexamined Patent Application, Publication No. 2002-31758 inserted after the objective lens.

BRIEF SUMMARY OF THE INVENTION

The present invention has been conceived in light of the circumstances described above, and an object thereof is to provide a microscope optical system, a microscope apparatus, and an observation method in which it is possible to switch between low-magnification wide-field observation and high-magnification observation while performing in vivo examination of a small laboratory animal or the like using a narrow-diameter objective lens, without having to change the objective lens.

To realize the object described above, the present invention provides the following solutions.

A first aspect of the present invention is a microscope optical system including an objective lens configured to collect light from an examination site; an image-forming lens configured to image the light collected by the objective lens on a detection device; and an auxiliary optical system having positive power, which is provided in a light path between the objective lens and the image-forming lens in such a manner as to be capable of being inserted and removed.

According to the first aspect of the invention, it is possible to perform wide-field observation with the auxiliary optical system inserted in the light path between the objective lens and the image-forming lens, and to perform magnified observation with the auxiliary optical system removed. Because the auxiliary optical system has positive power, the working distance of the objective lens changes. However, by adjusting the working distance, even when using an objective lens with a narrow diameter, it is possible to switch between wide-field observation and magnified observation without changing the objective lens.

The first aspect of the present invention described above may further include a flat plate that is inserted in and removed from the light path to change places with the auxiliary optical system when the auxiliary optical system is inserted in and removed from the light path between the objective lens and the image-forming lens.

The first aspect of the present invention described above may further include a Galilean afocal optical system that is inserted in and removed from the light path to change places with the auxiliary optical system when the auxiliary optical system is inserted in and removed from the light path between the objective lens and the image-forming lens.

The first aspect of the present invention described above may further include a Keppler afocal optical system that is inserted in and removed from the light path to change places with the auxiliary optical system when the auxiliary optical system is inserted in and removed from the light path between the objective lens and the image-forming lens.

The first aspect of the present invention described above may further include a reverse-Galilean afocal optical system that is inserted in and removed from the light path between the objective lens and the image-forming lens together with the auxiliary optical system.

Accordingly, it is possible to design the system so that the image-side pupil position does not move.

The first aspect of the present invention described above may further include inversion correcting apparatus for correcting image inversion due to insertion and removal of the auxiliary optical system.

The operation of the inversion-correcting apparatus enables inversion of the image to be prevented even when the auxiliary optical system is inserted and removed, and it is possible to prevent problems such as losing sight of the target site due to inversion of the image.

The first aspect of the present invention described above may further include working-distance correcting apparatus for correcting changes in working distance due to the insertion and removal of the auxiliary optical system.

The operation of the working-distance correcting apparatus enables automatic correction of changes in the working distance due to insertion and removal of the auxiliary optical system, and therefore, it is possible to acquire clear, in-focus wide-field observed images and magnified observed images.

In the first aspect of the present invention described above, center-position indicating apparatus for indicating a center image position on an acquired image may be provided in the auxiliary optical system.

Accordingly, the operation of the center-position indicating apparatus allows the center image position to be shown on the image. Therefore, by inserting the auxiliary optical system in the light path, it is possible to easily position the target site at the center of the image by showing the center image position with the center-position indicating apparatus while performing wide-field observation.

The first aspect of the present invention described above may further include immersion apparatus for supplying liquid between the objective lens and the specimen.

Accordingly, while performing magnified observation with the objective lens and the specimen in close proximity, it is possible to perform observation with the liquid present between the objective lens and the specimen.

The first aspect of the present invention described above may further include a moving mechanism configured to support an optical system including the objective lens so as to be capable of moving in an optical axis direction, wherein the moving mechanism may include a stopper configured to restrict a range of motion of the optical system to a distance matching a change in working distance due to insertion and removal of the auxiliary optical system.

With this configuration, when the working distance changes due to insertion and removal of the auxiliary optical system, operating the moving mechanism allows the optical system including the objective lens to be moved in the optical axis direction, which enables correction of changes in the working distance. In such a case, the range of motion of the optical system by the moving mechanism is restricted by the stopper. Therefore, simply by moving the optical system until it is stopped by the stopper, it is possible to easily correct for changes in working distance during either wide-field observation or magnified observation.

In the first aspect of the present invention described above, the auxiliary optical system may be configured so as to satisfy the following conditional expression:

$$0.0108 (\text{mm}) \leq [F_{OB}' - F_{SUB}] \leq 675 (\text{mm})$$

where $[F_{OB}' - F_{SUB}]$ is a distance between $F_{OB}'$ and $F_{SUB}$, where $F_{OB}'$ is an image-side focal point of the objective lens, and $F_{SUB}$ is an object-side focal point of the auxiliary optical system.

By doing so, it is possible to perform wide-field observation and magnified observation by inserting and removing the auxiliary optical system, according to the working distance which differs depending on the type of laboratory animal serving as the specimen.

A second aspect of the present invention is a microscope observation method used in the microscope optical system according to the first aspect described above, including a step of inserting the auxiliary optical system between the objective lens and the image-forming lens to perform wide-field observation; a step of aligning a center image position with the examination site of a specimen during the wide-field observation; a step of removing the auxiliary optical system from between the objective lens and the image-forming lens; a step of relatively moving the microscope optical system and the specimen by a change in working distance due to the removal of the auxiliary optical system; and a step of performing magnified observation.

A third aspect of the present invention is a microscope observation method used in the microscope optical system according to the first aspect described above, including a step of inserting the auxiliary optical system between the objective lens and the image-forming lens to perform wide-field observation; a step of aligning a center image position with an examination site on a specimen during the wide-field observation; a step of removing the auxiliary optical system from between the objective lens and the image-forming lens; a step of relatively moving the microscope optical system and the specimen by a change in working distance due to the removal of the auxiliary optical system; a step of supplying a liquid between the objective lens and the specimen; and a step of performing magnified observation.

In each of the aspects described above, the objective lens may include a first group configured to collect and substantially collimate light from the specimen, a second group configured to focus the substantially collimated light to form an intermediate image, and a third group configured to collect and substantially collimate the light forming the intermediate image.

Accordingly, it is possible to reduce the outer diameter of the tip of the objective lens, which allows easy in vivo examination of a specimen such as a small laboratory animal with minimal invasiveness.

A fourth aspect of the present invention is a microscope apparatus including an objective lens configured to collect light from an examination target; an image-forming lens configured to image the light collected by the objective lens on a detection device; an auxiliary optical system having positive power; an auxiliary-optical-system inserting and removing device which can insert and remove the auxiliary optical system in and from a light path between the objective lens and the image-forming lens; a working-distance correcting device configured to correct a working distance between the objective lens and the examination target according to a change in working distance of the objective lens caused by the insertion and removal of the auxiliary optical system; and an interlocking device configured to interlock the working-distance correction device and the auxiliary-optical-system inserting and removing device.

According to the fourth aspect of the present invention, by operating the auxiliary-optical-system inserting and removing device, it is possible to perform wide-field observation with the auxiliary optical system inserted in the light path between the objective lens and the image-forming lens, and to perform magnified observation with the auxiliary optical system removed. The image forming relationship is changed by inserting and removing the auxiliary optical system, which has positive power. Therefore, with the fourth aspect of the present invention, even when using a narrow-diameter objective lens, it is possible to switch between wide-field observation and magnified observation without changing the objective lens. In such a case, the working distance of the objective lens changes due to the insertion and removal of the auxiliary optical system. However, the working-distance correcting device and the auxiliary-optical-system inserting and removing device are interlocked by the operation of the interlocking device. Therefore, with the fourth aspect of the present invention, it is possible to eliminate complications involved with performing separate operations, thus allowing microscope observation to be carried out more easily.

The fourth aspect of the present invention described above may further include a plurality of illumination devices, wherein the interlocking device selectively switches between the plurality of illumination devices in an interlocking manner with the operation of the working-distance correcting device and the auxiliary-optical-system inserting and removing device.

Accordingly, it is possible to employ the illumination device that is best suited to wide-field observation and magnified observation, which enables wide-field observation and magnified observation to be performed correctly. In this case too, it is possible to eliminate complications involved with performing separate operations, thus allowing appropriate microscope observation to be carried out more easily.

The fourth aspect of the present invention described above may further include a plurality of detection devices, wherein the interlocking device selectively switches between the plurality of detection devices in an interlocking manner with the operation of the working-distance correcting device and the auxiliary-optical-system inserting and removing device.

Accordingly, it is possible to employ the detection device that is best suited to wide-field observation and magnified observation, which enables wide-field observation and magnified observation to be performed correctly. In this case too, it is possible to eliminate complications involved with performing separate operations, thus allowing appropriate microscope observation to be carried out more easily.

A fifth aspect of the present invention is a microscope observation method including a wide-field observation step of performing bright-field wide-field observation of a specimen such as a small laboratory animal; and a magnified-observation step of performing magnified fluorescence observation of the specimen using the same objective lens as that used in the wide-field observation step.

According to the fifth aspect of the present invention, without changing the objective lens, it is possible to switch between the wide-field observation step of observing the specimen with a bright field suited to wide-field observation and the magnified observation step of observing the specimen using fluorescence light suited to magnified observation. It is thus possible to easily perform observation of the entire image of the specimen and observation specially suited for a specific minute examination site.

In the fifth aspect of the present invention described above, with the objective lens inserted in the specimen, the wide-field observation step and the magnified-observation step may be performed by switching a working distance.

With this configuration, it is possible to switch the magnification and perform magnified observation with a target site that is specified during wide-field observation set at the center of the image.

In the fifth aspect of the present invention described above, the wide-field observation step may be an observation step in a dry system, and the magnified-observation step may be an observation step in a liquid-immersion system.

Accordingly, in the wide-field observation step where the working distance is increased, the observation step is carried out in a dry system where the tip of the objective lens and the specimen are separated. On the other hand, in the magnified observation step where the working distance is decreased, the observation step is carried out in a liquid immersion system where the tip of the objective lens and the specimen are brought into close proximity and the liquid is injected between the two. Accordingly, it is possible to easily carry out both wide-field observation and magnified observation.

The present invention provides an advantage in that it is possible to switch between low-magnification wide-field observation and high-magnification observation while performing in vivo examination of a small laboratory animal or the like using a narrow-diameter objective lens, without having to change the objective lens.

BRIEF DESCRIPTION OF THE SEVERAL VIEWS OF THE DRAWINGS

FIG. 39 is a plan view of a modification of the microscope apparatus in FIG. 36 during wide-field observation.

FIG. 40 is a partial front elevational view of the modification of the microscope apparatus in FIG. 36 during wide-field observation.

FIG. 41 is a plan view of the modification of the microscope apparatus in FIG. 36 during magnified observation.

FIG. 42 is a partial front elevational view of the modification of the microscope apparatus in FIG. 36 during magnified observation.

FIG. 43 is a side view of the modification of the microscope apparatus in FIG. 36 during wide-field observation.

DETAILED DESCRIPTION OF THE INVENTION

A microscope optical system 1 according to an embodiment of the present invention will be described below with reference to FIGS. 1 to 4.

Figure 1:
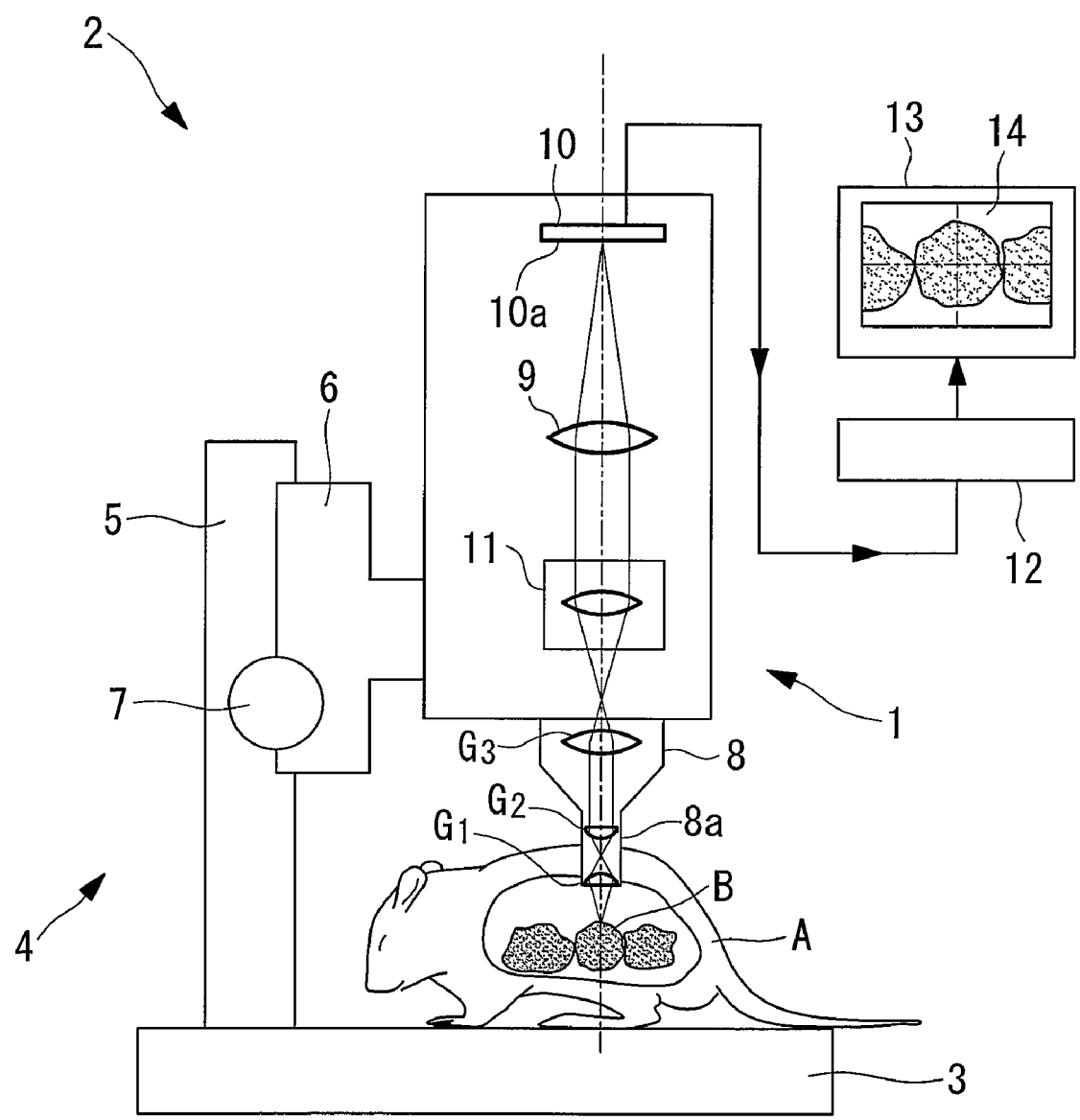
FIG. 1 is a schematic diagram of the overall configuration of a microscope apparatus provided with a microscope optical system according to a first embodiment of the present invention, during wide-field observation.

The microscope optical system 1 according to this embodiment is provided in a microscope apparatus 2 shown in FIG. 1.

The microscope apparatus 2 includes a stage 3 for mounting a small laboratory animal serving as a specimen A, the microscope optical system 1 according to this embodiment, and a moving mechanism 4 for moving the microscope optical system 1 upward and downward relative to the stage 3. The moving mechanism 4 includes a support stand 5 extending vertically from the stage 3 and a slider 6 provided so as to be capable of moving up and down on the support stand 5. The slider 6 is moved up and down relative to the stage 3 by operating a knob 7. The microscope optical system 1 is attached to the slider 6.

The microscope optical system 1 according to this embodiment includes an objective lens 8, having a narrow-diameter end portion 8a that is inserted inside the small laboratory animal serving as the specimen A through an incision made therein and collecting light from an examination site B on an internal organ or the like; an image-forming lens 9 for converging the light collected by the objective lens 8 to form an image; an image-acquisition device 10, such as a CCD, an image-acquisition surface 10a of which is disposed at the position of the image formed by the image-forming lens 9; and an auxiliary optical system 11 disposed in the light path between the objective lens 8 and the image-forming lens 9 in such a manner that it can be inserted and removed. A display device 13, such as a monitor (hereinafter referred to as monitor 13), is connected to the image-acquisition device 10 via an image-acquisition-device driver 12.

Figure 2:
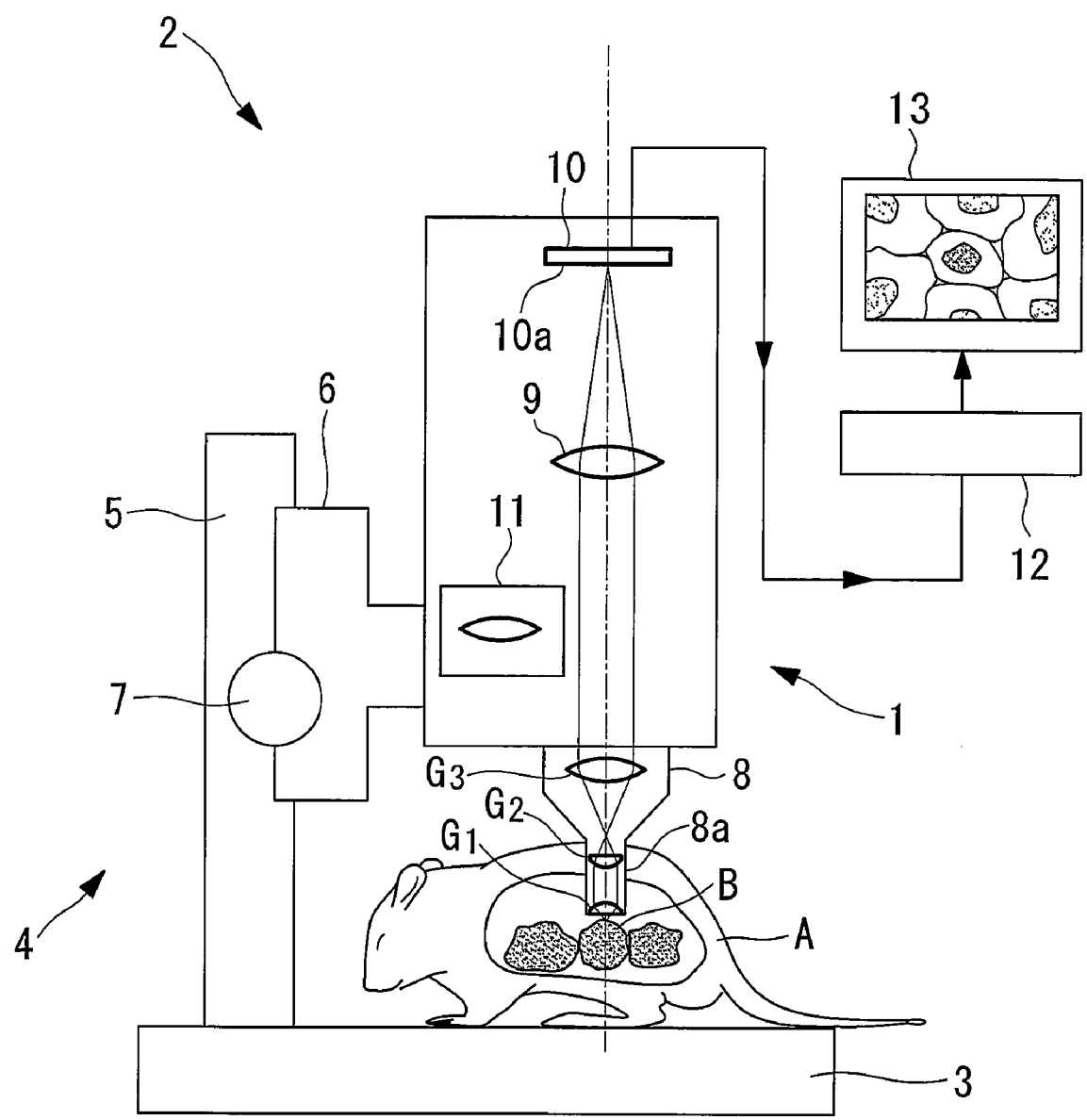
FIG. 2 is a schematic diagram of the overall configuration of the microscope optical system in FIG. 1 during magnified observation.

The objective lens 8 includes a first group $G_1$, a second group $G_2$, and a third group $G_3$. During magnified observation, as shown in FIG. 2, the first group $G_1$ collects light from a point on the examination site B of the specimen A and converts it to substantially collimated light. The second group $G_2$ converge the substantially collimated light to form an intermediate image. The third group $G_3$ collects the light forming the intermediate image and converts it to substantially collimated light. Accordingly, the objective lens 8 can transfer the light while keeping the beam diameter narrow, which allows the outer diameter of the narrow-diameter end portion 8a to be kept small. The objective lens 8 is disposed at the lowermost end of the microscope optical system 1, with its optical axis oriented vertically.

In this embodiment, the auxiliary optical system 11 is a lens having a prescribed positive power. Therefore, when the auxiliary optical system 11 is inserted in the light path between the objective lens 8 and the image-forming lens 9, the image-forming relationship changes compared to the case where the auxiliary optical system 11 is removed from the light path, as shown in FIGS. 1 and 2. In the drawings, the beam is indicated by its on-axis marginal rays.

Figure 3:
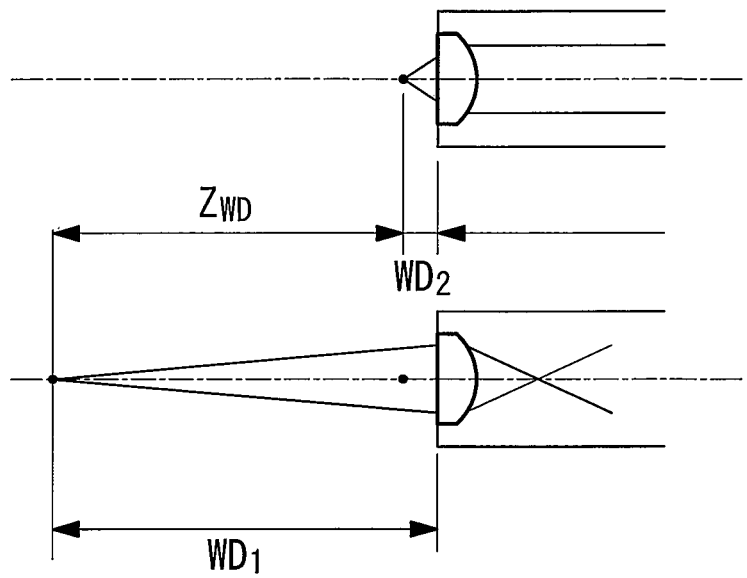
FIG. 3 is a diagram for explaining a change in working distance in the microscope optical system in FIG. 1.

As shown in FIG. 1, with the auxiliary optical system 11 inserted, the working distance is increased. Accordingly, as shown in FIG. 3, the microscope optical system 1 is focused at a position separated from the tip of the objective lens 8 by a working distance $WD_1$. On the other hand, as shown in FIG. 2, with the auxiliary optical system 11 removed, the working distance is reduced. Accordingly, the microscope optical system 1 is focused at a position separated from the tip of the objective lens 8 by a working distance $WD_2$. Therefore, by moving the slider 6 up and down by the change in working distance, $Z_{WD}=WD_1-WD_2$, due to the insertion and removal of the auxiliary optical system 11 to move the microscope optical system 1 in the optical axis direction thereof, it is possible to focus it in each imaging state.

The magnification of the observed image changes in these different imaging states. In the imaging state with a large working distance $WD_1$, as shown in FIG. 1, it is possible to perform wide-field observation over a large field of view with low magnification. On the other hand, in the imaging state with the short working distance $WD_2$, as shown in FIG. 2, it is possible to perform magnified observation over a narrow field of view with high magnification.

In this embodiment, center-position indicating apparatus 14 is provided in the auxiliary optical system 11. The center-position indicating apparatus 14 is, for example, a marker located close to the image position and formed of crosshairs that intersect on the optical axis. Therefore, as shown in FIG. 1, when the auxiliary optical system 11 is inserted in the light path, the center-position indicating apparatus 14 appears as crosshairs in the image displayed on the monitor 13. By using this center-position indicating apparatus 14 (hereinafter, sometimes also referred to as crosshairs 14), it is possible to easily identify the examination site B located at the center position of the image.

An observation method using the microscope apparatus 2 provided with the microscope optical system 1 according to this embodiment, configured in this way, will be described below.

To perform in vivo examination of the interior of the small laboratory animal serving as the specimen A using the microscope apparatus 2 provided with the microscope optical system 1 according to this embodiment, an incision is made in the abdomen of the specimen A mounted on the stage 3, and the narrow-diameter end portion 8a of the objective lens 8 is inserted through the incision. At this time, the specimen A is supplied with air via the incision to keep the abdominal cavity inflated.

Next, the auxiliary optical system 11 is inserted into the light path between the objective lens 8 and the image-forming lens 9, and a light source (not shown) is operated to illuminate the abdominal cavity. Thus, reflected light produced by reflection of the illumination light from the light source at the surface of the examination site B is collected by the objective lens 8 and is incident on the image-acquisition device 10 via the auxiliary optical system 11 and the image-forming lens 9. Image information output from the image-acquisition device 10 is displayed on the monitor 13 via the image-acquisition-device driver 12. While looking at the display on the monitor 13, the observer operates the knob 7 to move the slider 6 up and down to find the focus position.

Accordingly, when the focal position of the microscope optical system 1 is coincident with the surface of the examination site B, such as an internal organ, an image of the examination site B is formed at the image-acquisition surface 10a of the image-acquisition device 10. Thus, as shown in FIG. 1, a wide-field observed image of the examination site B is displayed on the monitor 13. At this time, the crosshairs 14 are simultaneously displayed on the monitor 13. Therefore, by operating the stage 3 to move the specimen A horizontally, while aiming at the crosshairs 14, the observer carries out adjustment so that the region in the examination site B where magnified observation is to be performed is located at the center position on the monitor 13.

Then, once the region where magnified observation is to be performed is located at the center position on the monitor 13, the auxiliary optical system 11 is removed from the light path between the objective lens 8 and the image-forming lens 9. Accordingly, due to the change in the image-forming relationship, the image on the monitor 13 becomes out of focus. The observer then brings the tip of the objective lens 8 close to the surface of the examination site B, such as an internal organ, by operating the knob 7 to lower the slider 6.

By doing so, in the course of this motion, the focus position of the microscope optical system 1 becomes coincident with the surface of the examination site B. As a result, as shown in FIG. 2, an image of the examination site B is formed on the image-acquisition surface 10a of the image-acquisition device 10, and a magnified observed image of the examination site B is displayed on the monitor 13.

Thus, with the microscope optical system 1 according to this embodiment, the image-forming relationship can be changed merely by inserting and removing the auxiliary optical system 11 having positive power in the light path between the objective lens 8 and the image-forming lens 9. This allows two types of observation methods with different magnifications, namely, wide-field observation and magnified observation, to be carried out. In this case, according to this embodiment, the magnification is changed without changing the objective lens 8. Therefore, in the microscope optical system 1 according to this embodiment, it is possible to switch between the observation methods while keeping the narrow-diameter end portion 8a of the objective lens 8 inserted in the incision in the small laboratory animal serving as the specimen A. As a result, with the microscope optical system 1 according to this embodiment, it is possible to change the magnification while keeping a target site, specified during wide-field observation, set at the center of the image on the monitor 13 and to carry out magnified observation.

The microscope optical system 1 according to this embodiment changes the magnification by changing the image-forming relationship. Therefore, with the microscope optical system 1 according to this embodiment, even though the diameter of the objective lens 8 is reduced in comparison with a method involving insertion and removal of a large optical system after the objective lens 8, as used in the related art, it is possible to ensure high magnification during magnified observation and a wide field of view during wide-field observation. Therefore, with the microscope optical system 1 according to this embodiment, it is possible to reduce the size of the incision made in the specimen A. As a result, with the microscope optical system 1 according to this embodiment, invasiveness is minimized and the burden placed on the specimen A is reduced, which affords an advantage in that it is possible to carry out in vivo examination while maintaining the viability of the specimen A.

In this embodiment, the insertion and removal position of the auxiliary optical system 11 is preferably set so as to satisfy expression (1) below.

$$0.0108 \text{(mm)} \leq [F_{OB}' - F_{SUB}] \leq 675 \text{(mm)} \qquad (1)$$

Here $[F_{OB}' - F_{SUB}]$ is the distance between $F_{OB}'$ and $F_{SUB}$, where $F_{OB}'$ is the image-side focal point of the objective lens 8 and $F_{SUB}$ is the object-side focal point of the auxiliary optical system 111.

Expression (1) is explained with reference to FIG. 3 and FIG. 4.

Figure 4:
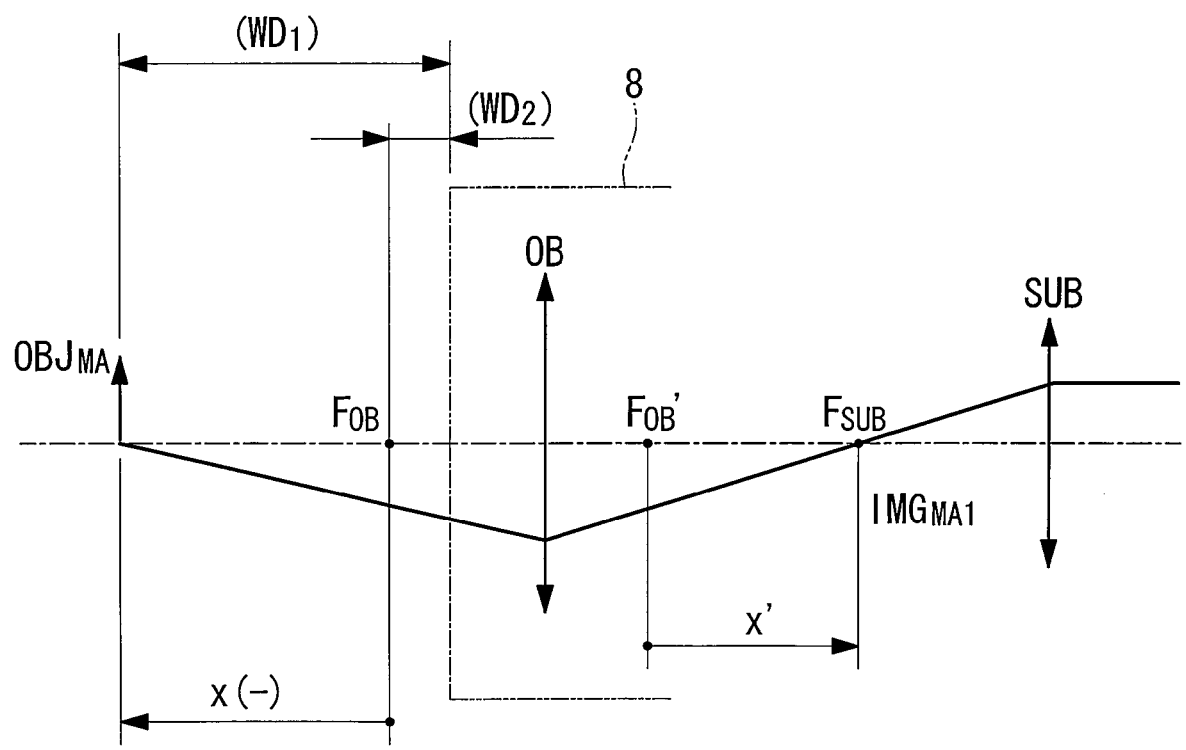
FIG. 4 is a diagram showing a paraxial ray trace for explaining an insertion position of an auxiliary optical system in the microscope optical system in FIG. 1.

FIG. 4 shows details of the rays in the region around the objective lens 8 during wide-field observation. In FIG. 4, reference symbol OB indicates the objective lens 8 and reference symbol SUB indicates the auxiliary optical system 11. During magnified observation, the objective lens 8 works as a so-called infinity objective lens in which the object plane is coincident with the object-side focal point, and during wide-field observation, it works as a so-called finite objective lens in which the object plane is located farther away than the object-side focal point.

The objective lens 8 in FIG. 1 is formed of three groups, that is, the first group $G_1$, the second group $G_2$, and the third group $G_3$, whereas the objective lens 8 in FIG. 4 is illustrated as being composed of only a single lens. In the objective lens 8 in FIG. 4, however, the three groups shown in FIG. 1 are simply replaced with a single lens; when a preferable value of the distance $[F_{OB}' - F_{SUB}]$, discussed below, is determined, there is no problem with the simplification shown in FIG. 4.

The coordinate in the optical axis direction in FIG. 4 is defined as positive in the direction from the object to the image. The object plane during wide-field observation is indicated by $OBJ_{MA}$ and is located a distance X (where X<0) from the focal point $F_{OB}$.

A first-order image plane formed by the objective lens 8 during wide-field observation is indicated by $IMG_{MA1}$ and is located a distance X' (where X>0) from the focal point $F_{OB}'$. This first-order image plane $IMG_{MA1}$ is located at the object-side focal point $F_{SUB}$ of the auxiliary optical system. Thus, the rays from the object are made parallel by the auxiliary optical system SUB and are imaged by the image-forming lens (not shown in the drawing).

Here, the preferable range of focal lengths of the objective lens 8 is determined. When the focal length of the objective lens is $f_{OB}$, the focal length of the image-forming lens is $f_{TL}$, and the optical magnification is $\beta$, the following expression holds:

$$f_{OB} = f_{TL}/\beta$$

The magnification $\beta$ suitable for examining tissue or cells of living organism is from 4 to 100. Thus, when the focal length $f_{TL}$ is 180 mm, the focal length $f_{OB}$ is from 45 mm to 1.8 mm.

FIG. 3 shows the relationship between the working distance $WD_1$ during wide-field observation and the working distance $WD_2$ during magnified observation. One issue during magnified observation is that it is necessary to restrict the motion of the examination site to stably observe the structure on a cellular level, because the examination site is inside the body of a live animal. To restrict the motion, it is effective to design, in advance, the working distance $WD_2$ of the objective lens 8 to be small and to press the end surface at the tip of the objective lens 8 against the examination site during observation. More specifically, the working distance $WD_2$ of the objective lens 8 is preferably a value in the range 0.01 mm $\leq WD_2 \leq$ 0.3 mm.

On the other hand, one issue with wide-field observation is that it is necessary to observe various types of laboratory animals with working distances that are suited to the size of their bodies. More specifically, in a representative laboratory animal, when air is injected into the abdominal cavity to inflate it for wide-field observation of the internal organs, the values below are preferable for the working distance $WD_1$.

Pig: 60 mm to 300 mm
Dog: 20 mm to 100 mm
Rabbit: 10 mm to 50 mm
Rat: 5 mm to 25 mm
Mouse: 3 mm to 15 mm On the other hand, the working distance $WD_1$ during wide-field observation, the working distance $WD_2$ during magnified observation, and the change in working distance $Z_{WD}$ satisfy the relationship $Z_{WD} = WD_1 - WD_2$. Furthermore, comparing the preferred values of the working distances $WD_1$ and $WD_2$ mentioned above, $WD_1 \geq WD_2$. Therefore, an explanation of the case where $Z_{WD} \approx WD_1$ will be given below.

In FIG. 4, the following expression, from Newton's formula, holds between the distances X and X' and the focal length $f_{OB}$:

$$X \cdot X' = -f_{OB}^2$$

The following expression also holds:

$$|X| = Z_{WD} \approx WD_1$$

From these two expressions, we have:

$$WD_1 \approx Z_{WD} = |X| = |-f_{OB}^2/X'| = |f_{OB}^2/X'|$$

therefore, $$X' \approx f_{OB}^2/WD_1$$

(when X'>0).

In this expression, by substituting the preferable values of $f_{OB}$ and $WD_1$ mentioned above, we obtain the following preferable range of values for X'.

TABLE 1

| | | | THE PREFERRED VALUE OF THE WORKING DISTANCE $WD_1$ (mm) DURING WIDE-FIELD OBSERVATION | | |
|---|---|---|---|---|---|
| | | | MINIMUM VALUE 3 | 30 | MAXIMUM VALUE 300 |
| THE PREFERABLE VALUE OF FOCAL LENGTHS Fob (mm) OF THE OBJECTIVE LENS | MAXIMUM VALUE | 45 | X' = 675 (mm) | 67.5 | 6.75 |
| | MINIMUM VALUE | 1.8 | 1.08 | 0.11 | 0.0108 |

In other words, the preferable range of X' in the table shown above is from the minimum value of 0.0108 mm to the maximum value of 675 mm, and because X' is just $[F_{OB}' - F_{SUB}]$ mentioned above, we obtain:

$$0.0108 (\text{mm}) \leq [F_{OB}' - F_{SUB}] \leq 675 (\text{mm})$$

Figure 5:
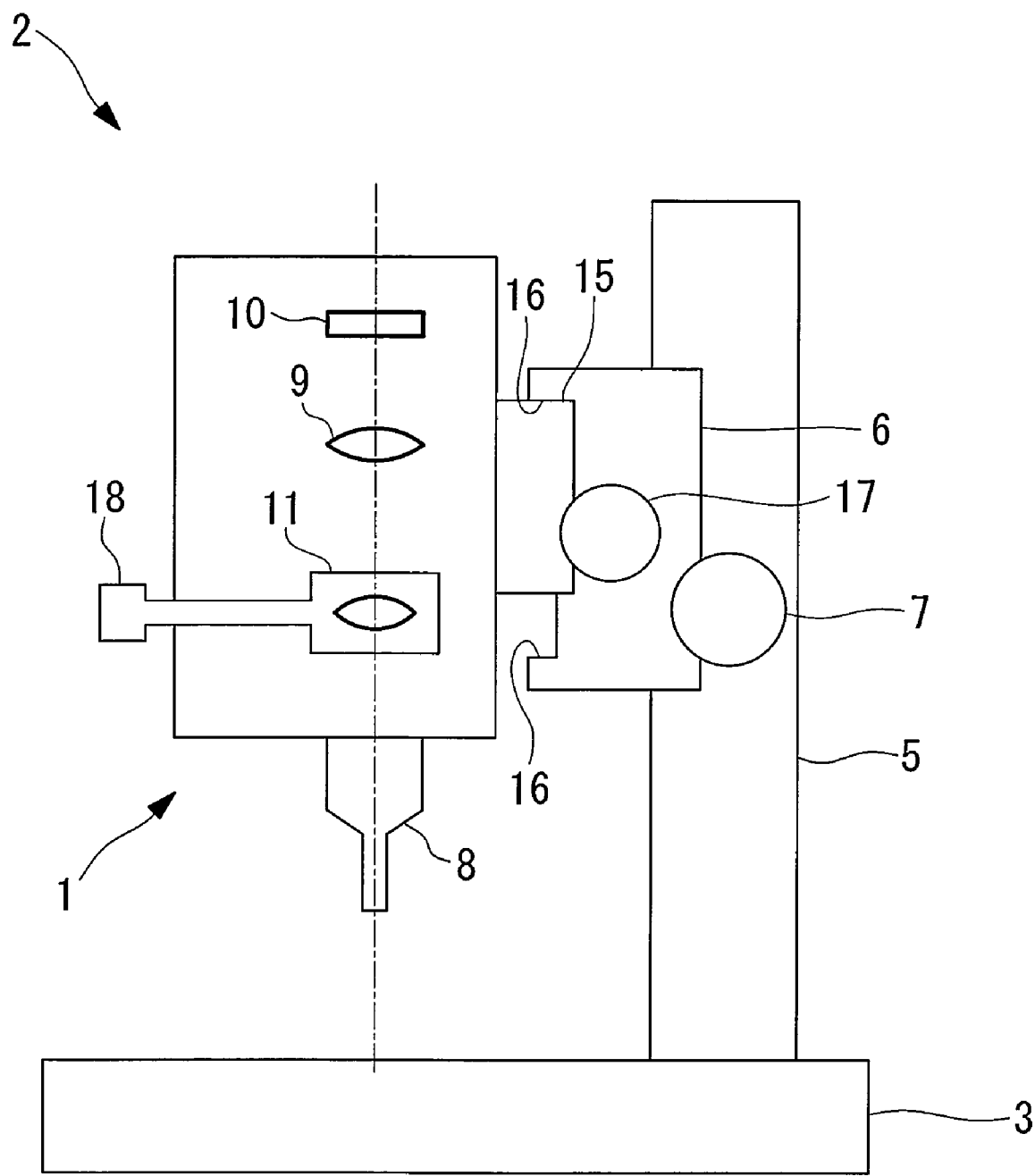
FIG. 5 is a schematic diagram of the overall configuration of a first modification of the microscope optical system in FIG. 1, during wide-field observation.
Figure 6:
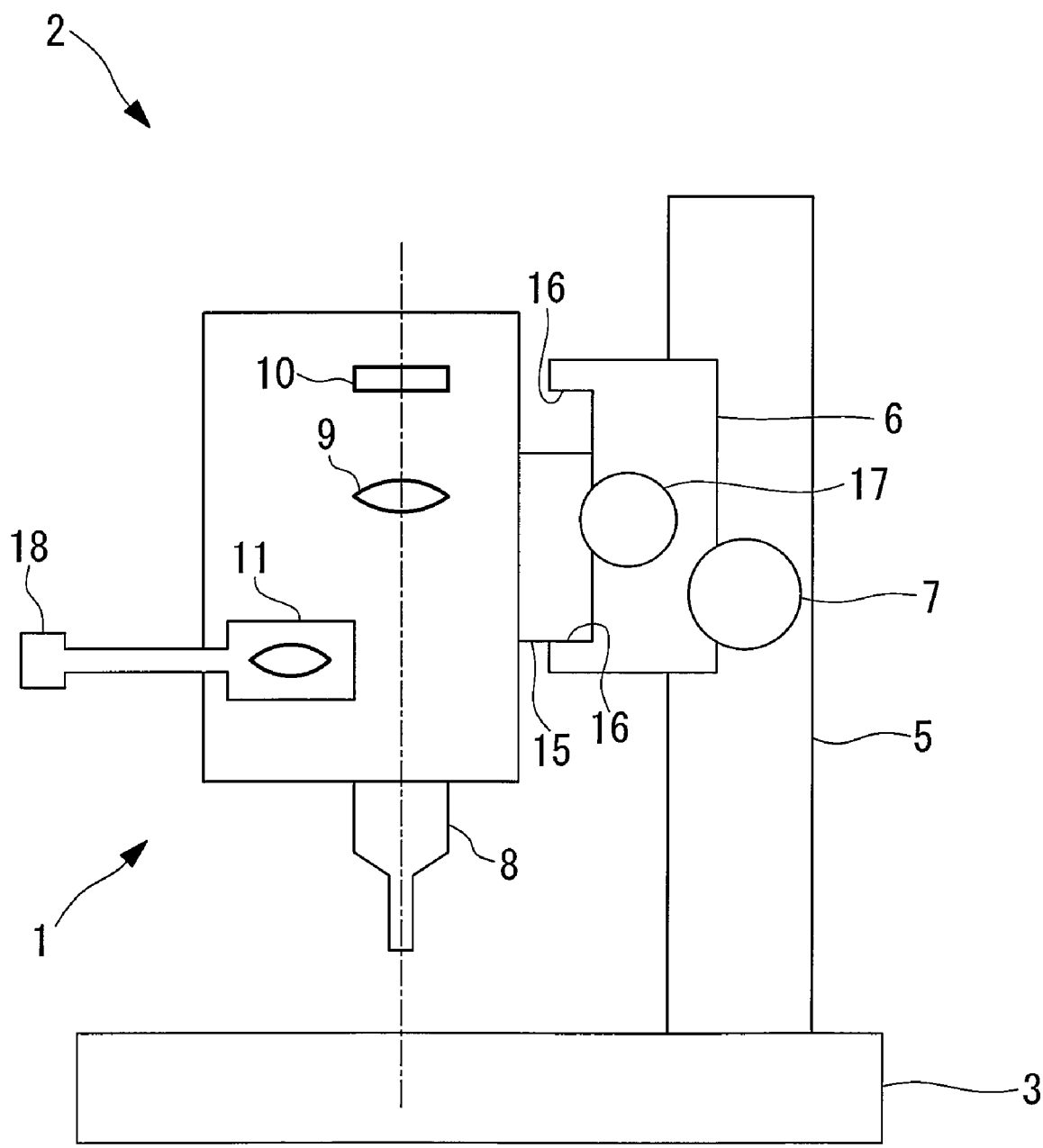
FIG. 6 is a schematic diagram of the overall configuration of the microscope optical system in FIG. 5 during magnified observation.

In this embodiment, the observer operates the knob 7 to move the slider 6 up and down by the change in working distance $Z_{WD}$, to focus in the two observation methods. However, the change in working distance $Z_{WD}$ due to insertion and removal of the auxiliary optical system is set in advance, as described above. Therefore, as shown in FIG. 5 and FIG. 6, a second slider 15 for moving the microscope optical system 1 up and down may be provided on the slider 6, and stoppers 16 may be provided for limiting the range of motion of the second slider 15 on the slider 6 to a range matching the change in working distance $Z_{WD}$. In the figures, reference numeral 17 is a knob for moving the second slider 15 up and down, and reference numeral 18 is a handle for inserting and removing the auxiliary optical system 11.

With this configuration, when switching between observation methods by inserting and removing the auxiliary optical system 11, it is possible to easily correct changes in the working distance WD merely by moving the second slider 15 to the position where it abuts against the stopper 16. By doing so, it is possible to quickly display on the monitor 13 a clear, in-focus, magnified image of the target site identified in wide-field observation.

Figure 7:
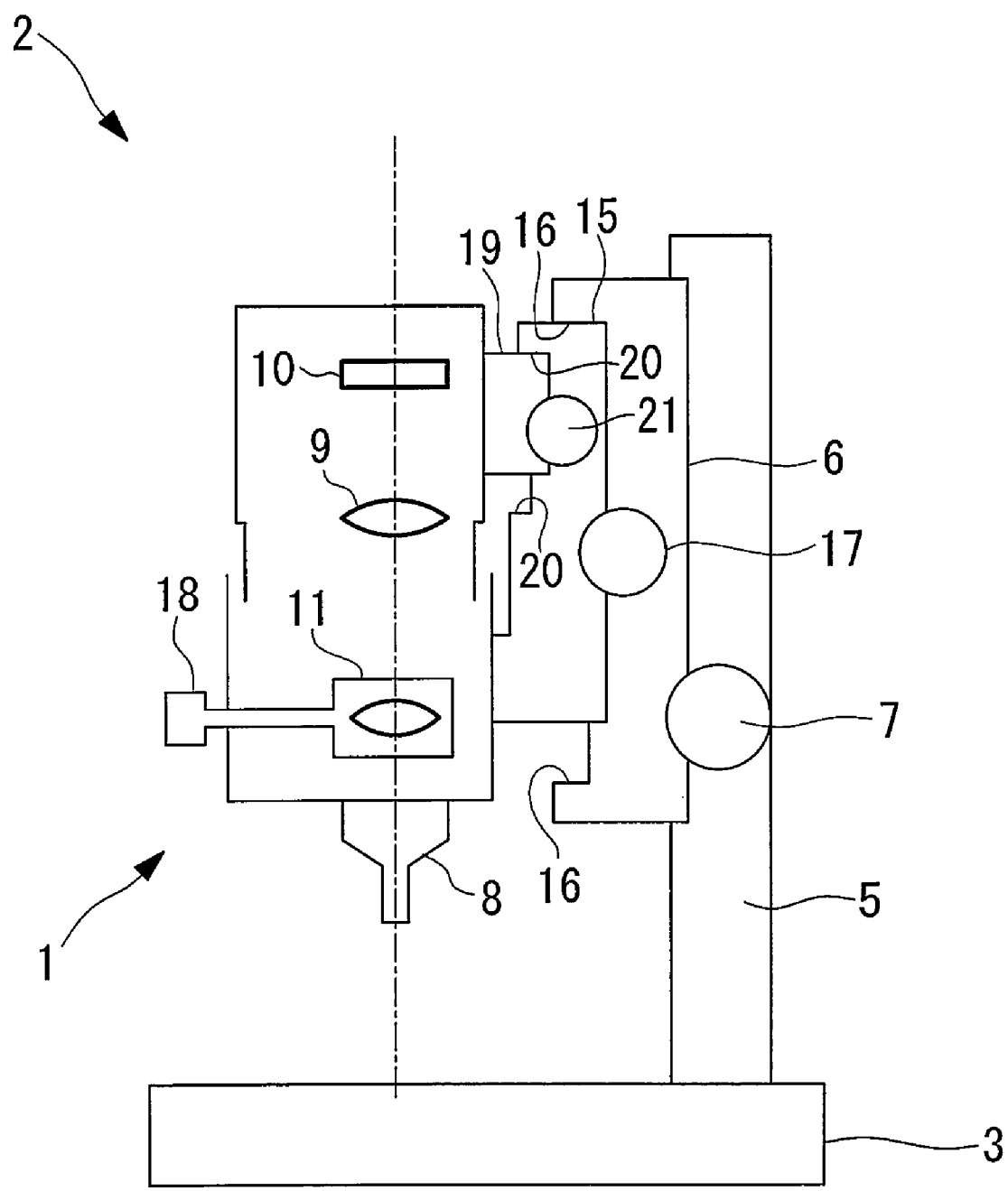
FIG. 7 is a schematic diagram of the overall configuration of a second modification of the microscope optical system in FIG. 1 during wide-field observation.
Figure 8:
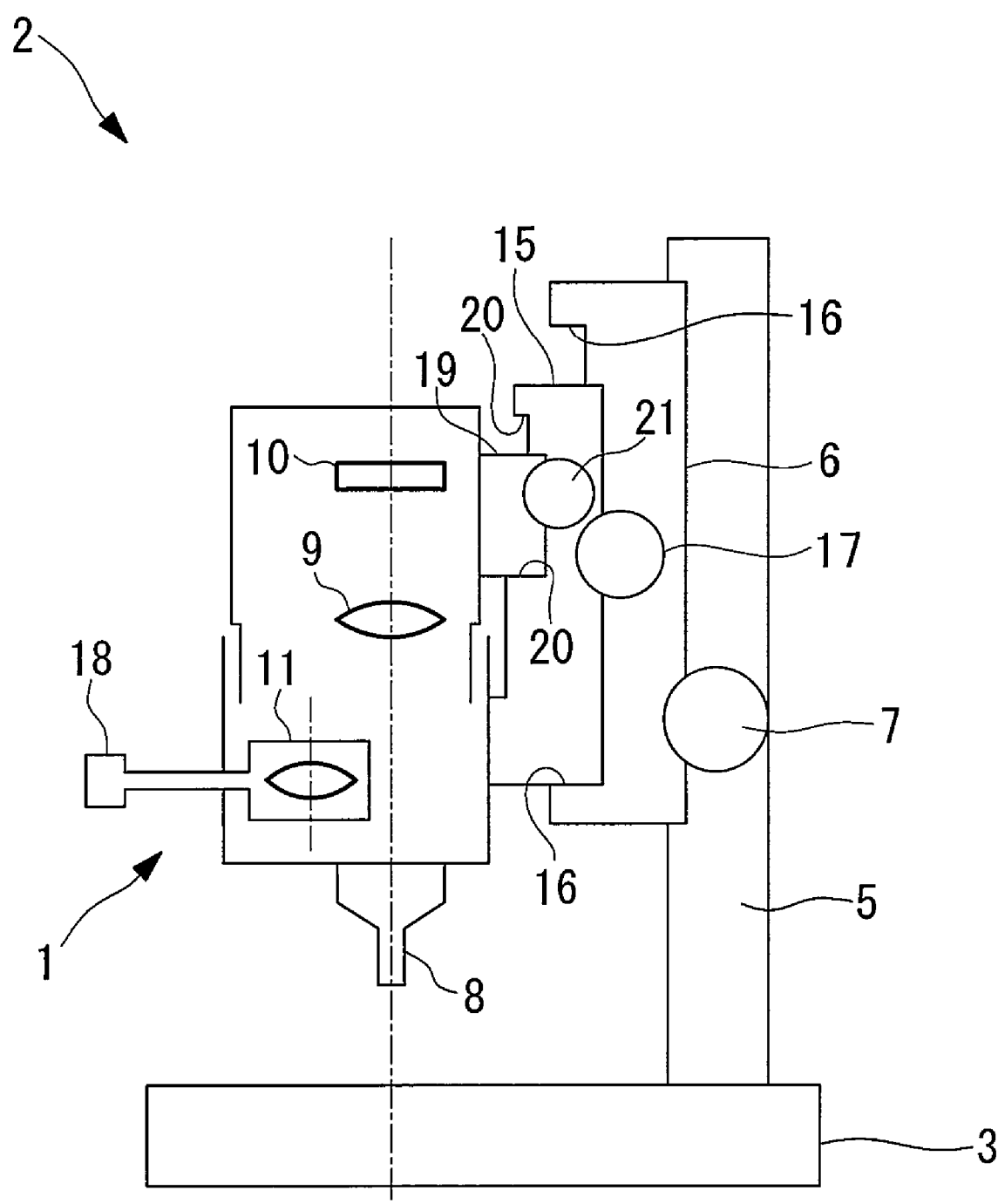
FIG. 8 is a schematic diagram of the overall configuration of the microscope optical system in FIG. 7 during magnified observation.

As shown in FIG. 7 and FIG. 8, a third slider 19 that can move up and down on the second slider 15 may be provided. The objective lens 8 and the auxiliary optical system 11 may be supported on the second slider 15, and the image-forming lens 9 and the image-acquisition device 10 may be supported on the third slider 19. In such a case, similar to the above, it is preferable to provide stoppers 20 for limiting the range of motion of the third slider 19 relative to the second slider 15.

In the figures, reference numeral 21 is a knob for moving the third slider 19 up and down.

The image-forming condition-changes due to insertion and removal of the auxiliary optical system 11, and the pupil position at the image side moves simultaneously. When the pupil position at the image side moves, the angle of incidence on the image-acquisition device 10 changes; it is preferable to avoid this change in incidence angle. It is possible to avoid shifting of the pupil position at the image side by operating the third slider 19. Accordingly, it is possible to prevent variations in image brightness or nonuniform image brightness as a result of switching the observation method. In particular, it is possible to prevent a reduction in brightness in the peripheral regions of the image.

EXAMPLE

Next, an Example of the microscope optical system 1 according to this embodiment will be described below with reference to FIGS. 9 to 12 and Tables 2 and 3. In the figures, reference symbol TL indicates the image-forming lens 9, reference symbol IMG indicates the image-acquisition surface 10a of the image-acquisition device 10, reference symbol OBJ indicates the object plane, reference symbol $OB_I$ indicates the first group $G_1$ of the objective lens 8, reference symbol $OB_{II}$ represents the second group $G_2$ of the objective lens 8, and reference symbol $OB_{III}$ represents the third group $G_3$ of the objective lens 8.

TABLE 2

| NUMBER n | [SURFACES OR THIN LENSES] NAME | ABBREVIATION | FOCAL LENGTH $f_n$ | REFRACTIVE POWER $\psi_n$ | SEPARATION $d_n'$ | POSITION $z_n$ | REFRACTIVE INDEX OF MEDIUM $N_n'$ | CONVERSION DISTANCE $e_n'$ |
|---|---|---|---|---|---|---|---|---|
| 0 | THE OBJECT PLANE (MICRO) | $OBJ_{MI}$ | — | — | 1 | 0 | 1 | 1 |
| 1 | THE FIRST GROUP OF THE OBJECT LENS | $OB_I$ | 1 | 1 | 5 | 1 | 1 | 5 |
| 2 | THE SECOND GROUP OF THE OBJECT LENS | $OB_{II}$ | 4 | 0.25 | 40 | 6 | 1 | 40 |
| 3 | THE THIRD GROUP OF THE OBJECT LENS | $OB_{III}$ | 36 | 0.027778 | 216 | 46 | 1 | 216 |
| 4 | THE IMAGE-FORMING LENS | TL | 180 | 0.005556 | 180 | 262 | 1 | 180 |
| 5 | THE IMAGE-ACQUISITION SURFACE | IMG | — | — | — | 442 | — | — |

TABLE 3

| NUMBER n | [SURFACES OR THIN LENSES] NAME | ABBREVIATION | FOCAL LENGTH $f_n$ | REFRACTIVE POWER $\psi_n$ | SEPARATION $d_n'$ | POSITION $z_n$ | REFRACTIVE INDEX OF MEDIUM $N_n'$ | CONVERSION DISTANCE $e_n'$ |
|---|---|---|---|---|---|---|---|---|
| 0 | THE OBJECT PLANE (MACRO) | $OBJ_{MA}$ | — | — | 23.5 | 0 | 1 | 23.5 |
| 1 | THE FIRST GROUP OF THE OBJECT LENS | $OB_I$ | 1 | 1 | 5 | 1 | 1 | 5 |
| 2 | THE SECOND GROUP OF THE OBJECT LENS | $OB_{II}$ | 4 | 0.25 | 40 | 6 | 1 | 40 |
| 3 | THE THIRD GROUP OF THE OBJECT LENS | $OB_{III}$ | 36 | 0.027778 | 75.6 | 46 | 1 | 75.6 |
| 4 | AUXILIARY LENS | SUB | 36 | 0.027778 | 140.4 | 121.6 | 1 | 140.4 |
| 5 | THE IMAGE-FORMING LENS | TL | 180 | 0.005556 | 180 | 262 | 1 | 180 |
| 6 | THE IMAGE-ACQUISITION SURFACE | IMG | — | — | — | 442 | — | — |

Figure 9:
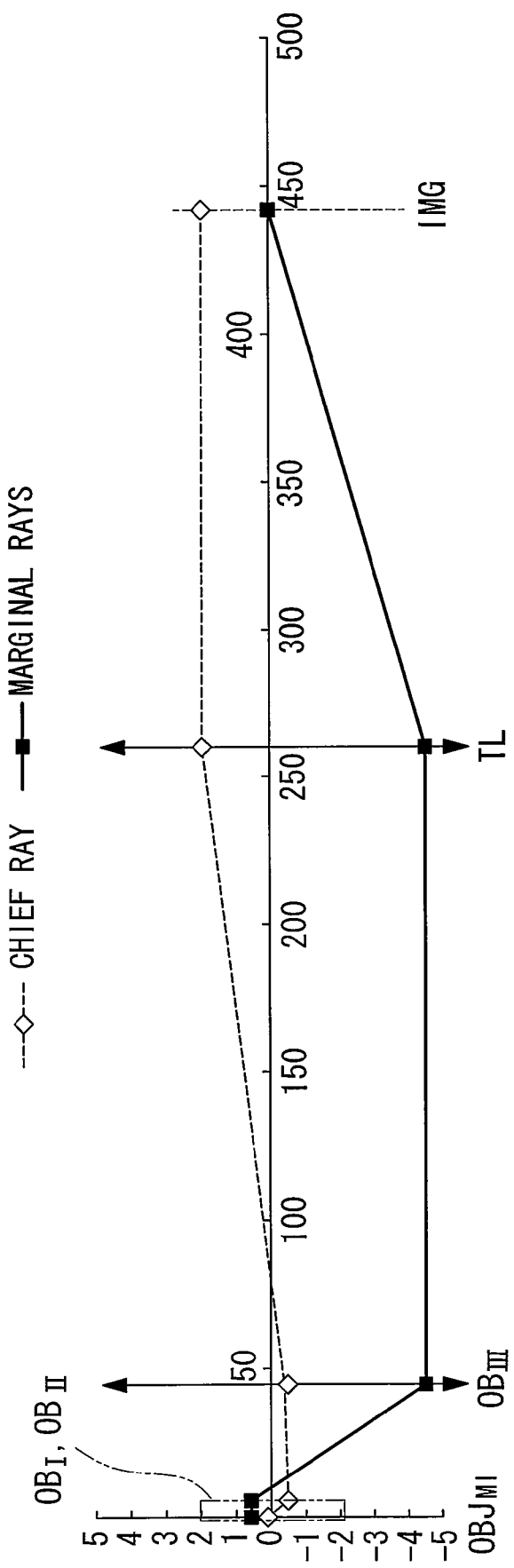
FIG. 9 is a diagram showing paraxial ray-trace results of an Example of the microscope optical system in FIG. 1 during magnified observation.
Figure 10:
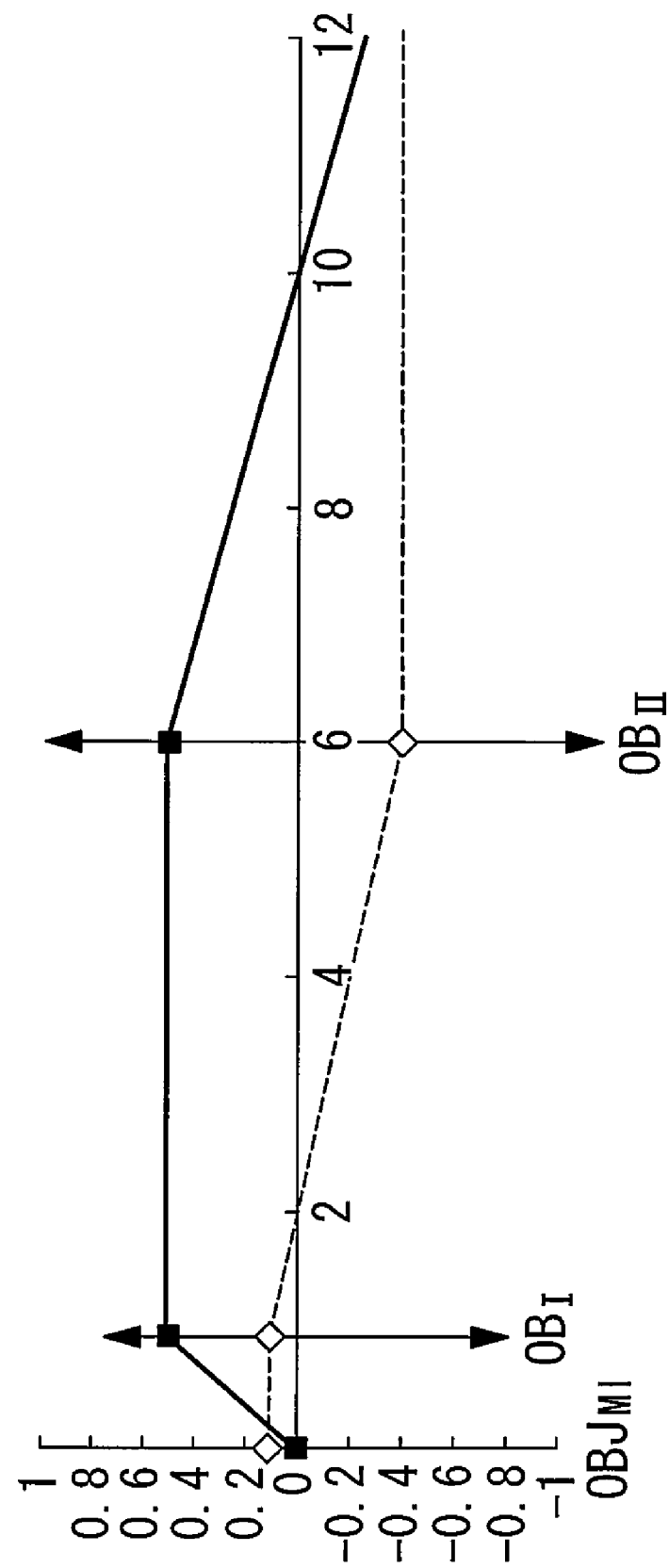
FIG. 10 is a magnified view of the paraxial ray-trace results in FIG. 9 in the vicinity of the object plane.

Table 2 shows sample lens data, obtained from a thin lens model, of the microscope optical system 1 in this embodiment during magnified observation, that is to say, with the auxiliary optical system 11 removed. Here, the magnification is 20 times. Paraxial ray tracing results when the object-plane field diameter is 0.2 and the image-plane field diameter is 4 are shown in FIGS. 9 and 10. FIG. 9 shows the paraxial ray tracing results for the entire microscope optical system 1, and FIG. 10 shows the magnified paraxial ray trace results in the vicinity of the object plane. In the figures, $OBJ_{MI}$ indicates the object plane during magnified observation.

Table 3 shows sample lens data, obtained from a thin lens model, of the microscope optical system 1 in this embodiment during wide-field observation, that is to say, with the auxiliary optical system 11 inserted. Here, the magnification is 2 times. If the image-plane field diameter is set to 4, as in the magnified observation described above, the object-plane field diameter is 2. Thus, wide-field observation with an object-plane field diameter that is 10 times the value during the magnified observation described above is possible.

Figure 11:
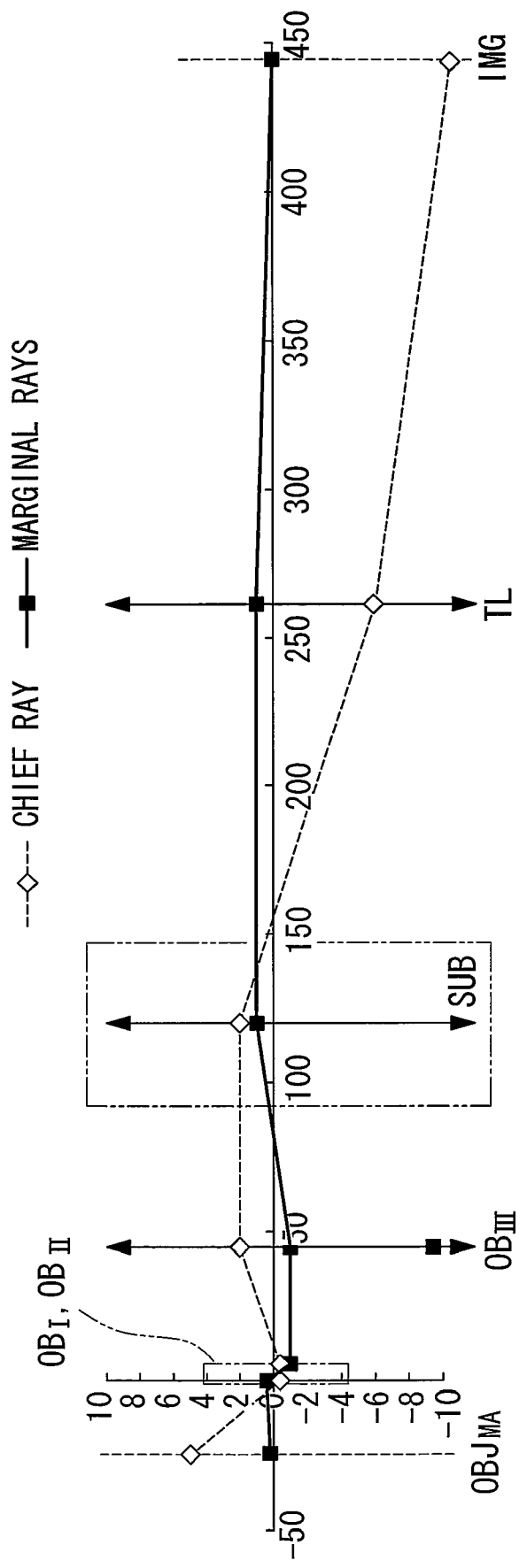
FIG. 11 is a diagram showing paraxial ray-trace results of the example of the microscope optical system in FIG. 1 during wide-field observation.
Figure 12:
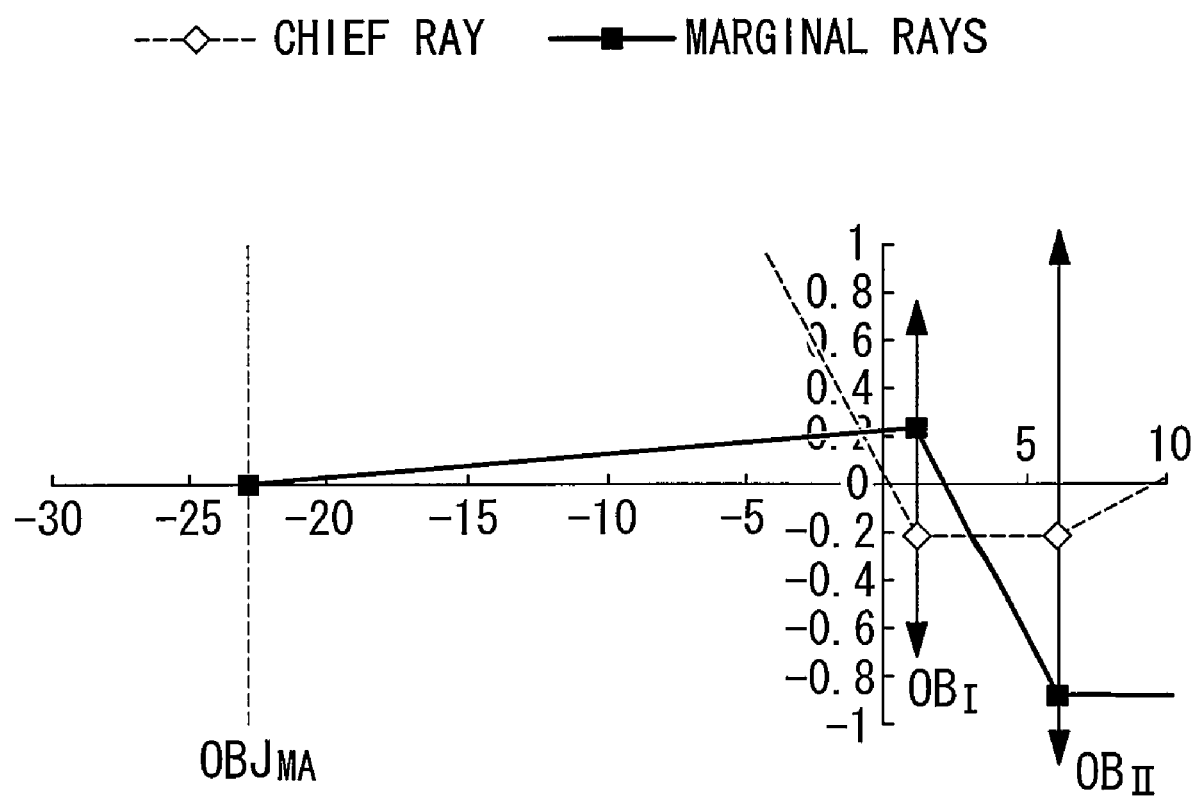
FIG. 12 is a magnified view of the paraxial ray-trace results in FIG. 11 in the vicinity of the object plane.

Paraxial ray trace results for the case where the image-plane field diameter is 20 are shown in FIGS. 11 and 12. FIG. 11 shows paraxial ray trace results for the entire microscope optical system 1, and FIG. 12 shows the magnified paraxial ray trace results in the vicinity of the object plane. In the figures, $OBJ_{MA}$ indicates the object plane during wide-field observation.

Comparing FIGS. 10 and 12, there is a difference, as explained below. For the object-side rays during magnified observation in FIG. 10, the gradient of the marginal ray is large (in other words, the numerical aperture (NA) is large), and the chief ray is parallel to the optical axis (in other words, the system is telecentric). In contrast, for the object-side rays during wide-field observation in FIG. 12, the gradient of the marginal ray is small (in other words, the NA is small), and the chief ray is tilted with respect to the optical axis (in other words, the system is non-telecentric).

This means that it is more difficult for aberrations or vignetting to occur during wide-field observation than during magnified observation, and a clear image with uniform brightness up to the edges is obtained, even with a larger image-plane field of view. FIGS. 11 and 12 show cases where the image-plane field diameter is 20, based on this property of the optical system during wide-field observation. The object-plane field diameter in this case is 10. Thus, wide-field observation with an object-plane field diameter that is 50 times greater than that during magnified observation is possible.

Figure 13:
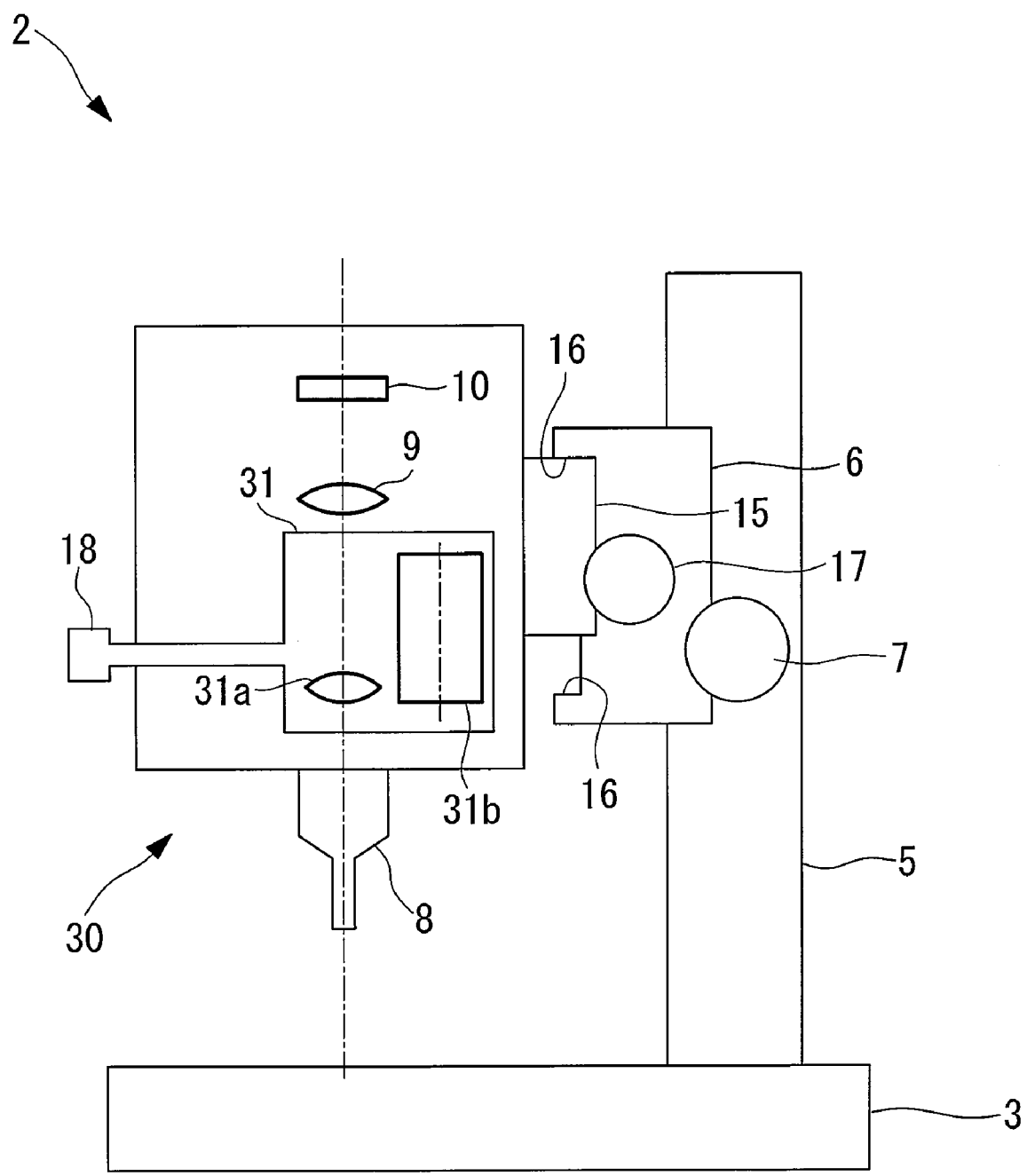
FIG. 13 is a diagram showing, in outline, the overall configuration of a microscope apparatus including a microscope optical system according to a second embodiment of the present invention, during wide-field observation.
Figure 14:
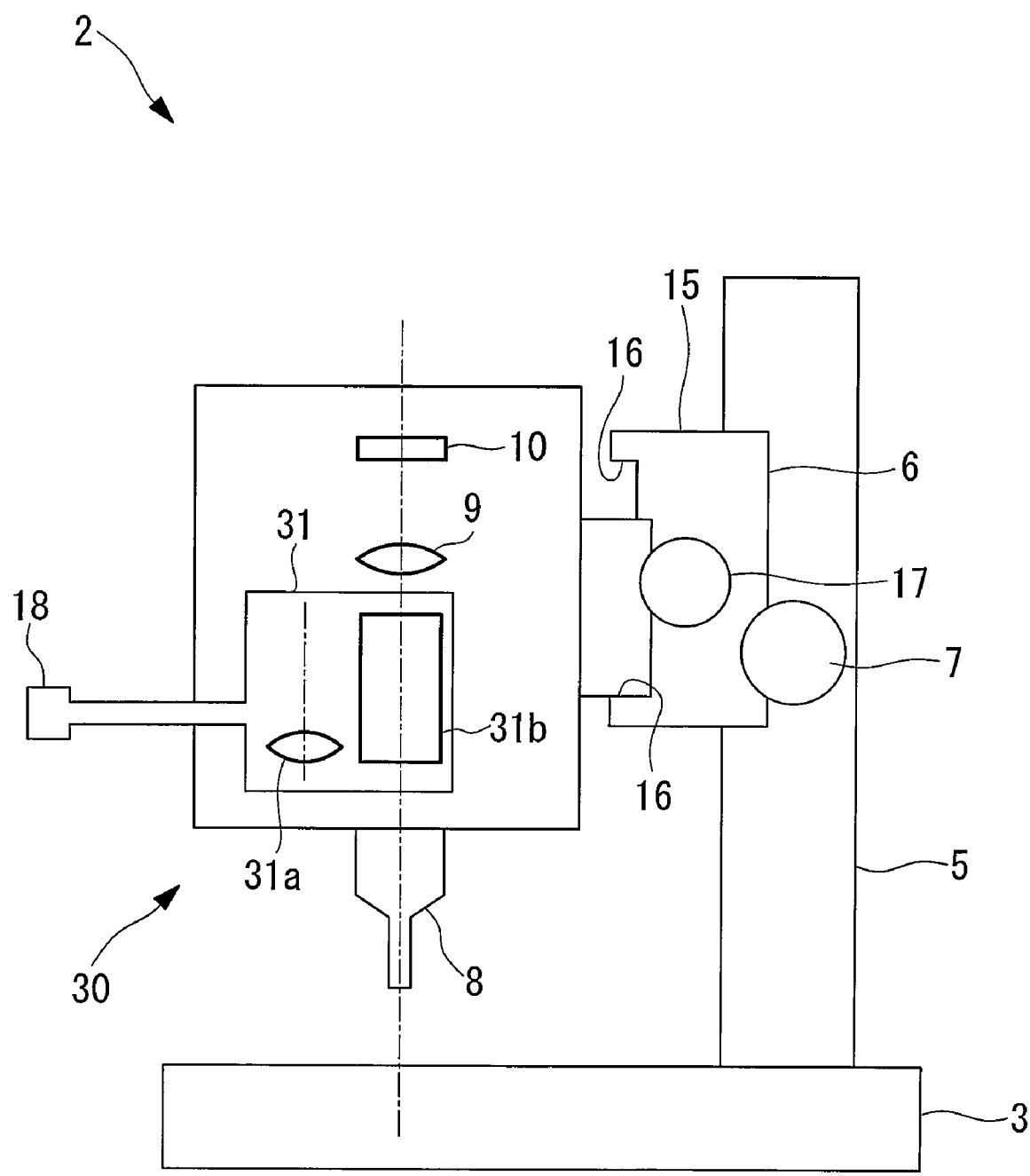
FIG. 14 is a diagram for explaining a change in working distance in the microscope optical system in FIG. 13.

Next, a microscope optical system 30 according to a second embodiment of the present invention will be described below with reference to FIG. 13 and FIG. 14.

In the description of this embodiment, parts having the same configuration as those of the microscope optical system 1 and the microscope apparatus 2 according to the first embodiment described above are assigned the same reference numerals, and a description thereof shall be omitted here.

The difference between the microscope optical system 30 according to this embodiment and that in the first embodiment is an auxiliary optical system 31. In this embodiment, as shown in FIGS. 13 and 14, the auxiliary optical system 31 includes a parallel flat plate 31b forming a pair with a lens 31a (auxiliary optical system) having positive power.

When the lens 31a of the auxiliary optical system 31 is inserted in the light path between the objective lens 8 and the image-forming lens 9, the parallel flat plate 31b is removed from the light path. On the other hand, when the lens 31a is removed from the light path between the objective lens 8 and the image-forming lens 9, the parallel flat plate 31b is inserted at the same position in place of the lens 31a.

The microscope optical system 30 according to this embodiment, having such a configuration, affords an advantage in that it is possible to prevent shifting of the image-side pupil position due to switching between wide-field observation and magnified observation, without providing the third slider 19 described above.

EXAMPLE

An Example of the microscope optical system 30 according this embodiment is described below with reference to FIGS. 15 to 18 and Tables 4 and 5.

TABLE 4

| NUMBER n | [SURFACES OR THIN LENSES] NAME | ABBREVIATION | FOCAL LENGTH $f_n$ | REFRACTIVE POWER $\psi_n$ | SEPARATION $d_n'$ | POSITION $z_n$ | REFRACTIVE INDEX OF MEDIUM $N_n'$ | CONVERSION DISTANCE $e_n'$ |
|---|---|---|---|---|---|---|---|---|
| 0 | THE OBJECT PLANE (MICRO) | $OBJ_{MI}$ | — | — | 1 | 0 | 1 | 1 |
| 1 | THE FIRST GROUP OF THE OBJECT LENS | $OB_I$ | 1 | 1 | 5 | 1 | 1 | 5 |
| 2 | THE SECOND GROUP OF THE OBJECT LENS | $OB_{II}$ | 4 | 0.25 | 40 | 6 | 1 | 40 |
| 3 | THE THIRD GROUP OF THE OBJECT LENS | $OB_{III}$ | 36 | 0.027778 | 46 | 46 | 1 | 46 |
| 4 | THE FIRST PLANE OF THE PARALLEL FLAT PLATE | PP1 | — | 0 | 161.2 | 92 | 1.883 | 85.6081 |
| 5 | THE SECOND PLANE OF THE PARALLEL FLAT PLATE | PP2 | — | 0 | 84.4 | 253.4 | 1 | 84.4 |
| 6 | THE IMAGE-FORMING LENS | TL | 180 | 0.005556 | 180 | 337.6 | 1 | 180 |
| 7 | THE IMAGE-ACQUISITION SURFACE | IMG | — | — | — | 517.6 | — | — |

TABLE 5

| NUMBER n | [SURFACES OR THIN LENSES] NAME | ABBREVIATION | FOCAL LENGTH fn | REFRACTIVE POWER ψn | SEPARATION dn' | POSITION zn | REFRACTIVE INDEX OF MEDIUM Nn' | CONVERSION DISTANCE en' |
|---|---|---|---|---|---|---|---|---|
| 0 | THE OBJECT PLANE (MACRO) | $OBJ_{MA}$ | — | — | 23.5 | −22.5 | 1 | 23.5 |
| 1 | THE FIRST GROUP OF THE OBJECT LENS | $OB_I$ | 1 | 1 | 5 | 1 | 1 | 5 |
| 2 | THE SECOND GROUP OF THE OBJECT LENS | $OB_{II}$ | 4 | 0.25 | 40 | 6 | 1 | 40 |
| 3 | THE THIRD GROUP OF THE OBJECT LENS | $OB_{III}$ | 36 | 0.027778 | 75.6 | 46 | 1 | 75.6 |
| 4 | AUXILIARY LENS | SUB | 36 | 0.027778 | 216 | 121.6 | 1 | 216 |
| 5 | THE IMAGE-FORMING LENS | TL | 180 | 0.005556 | 180 | 337.6 | 1 | 180 |
| 6 | THE IMAGE-ACQUISITION SURFACE | IMG | — | — | — | 517.6 | — | — |

Figure 15:
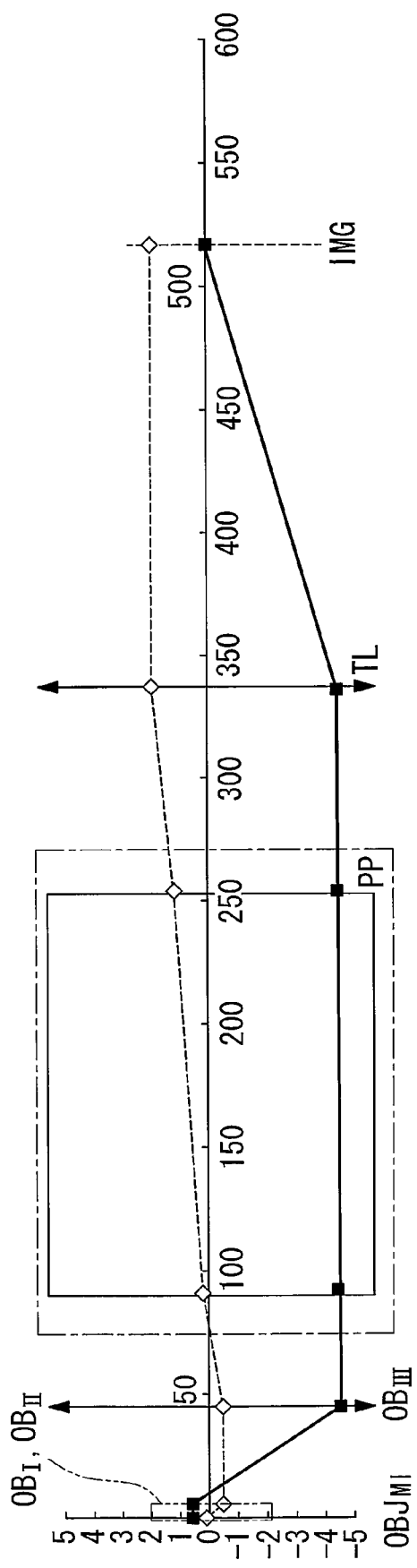
FIG. 15 is a diagram showing paraxial ray-trace results of an Example of the microscope optical system in FIG. 13 during magnified observation.
Figure 16:
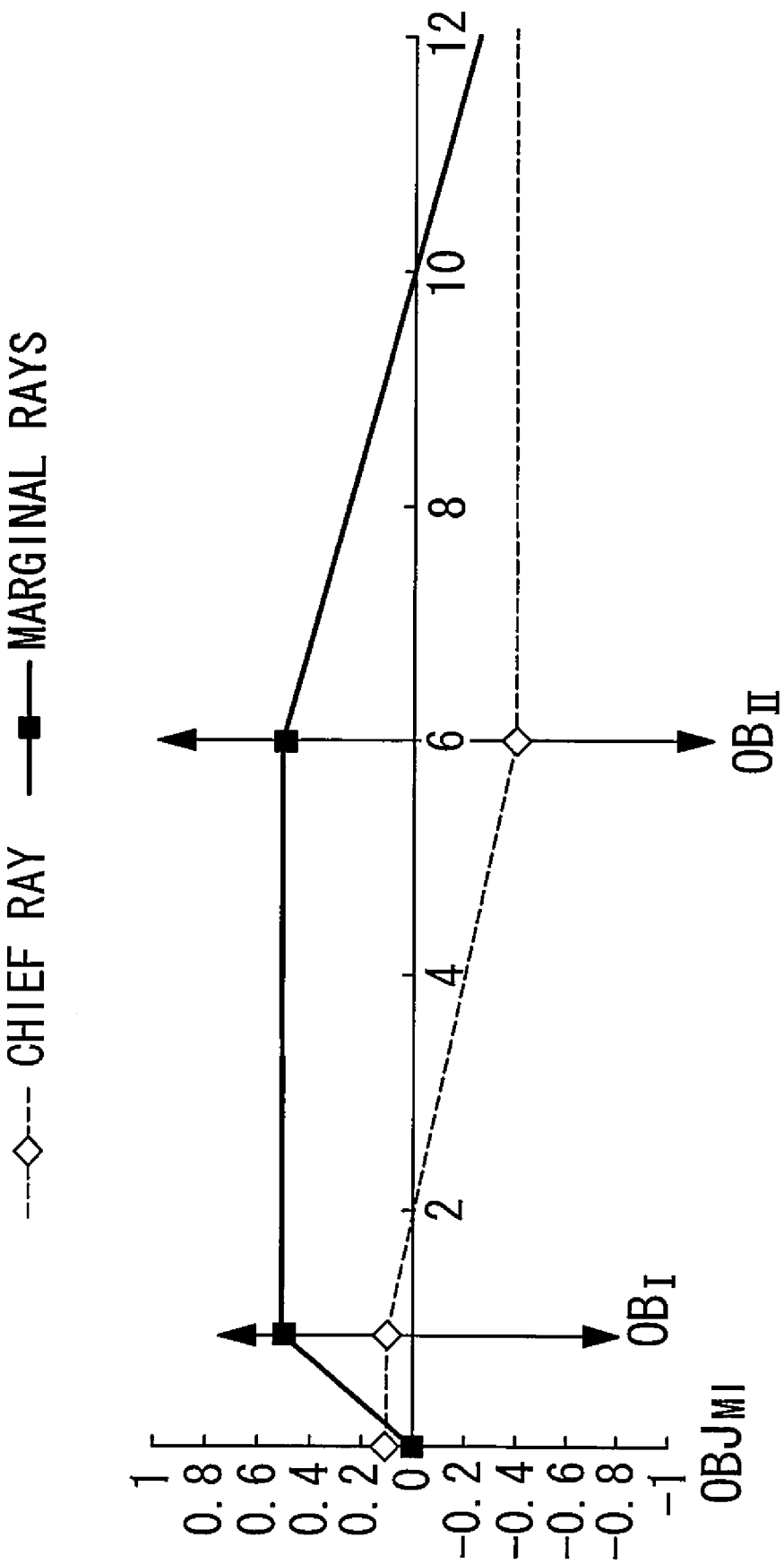
FIG. 16 is a magnified view of the paraxial ray-trace results in FIG. 15 in the vicinity of the object plane.

Table 4 shows sample lens data, obtained from a thin lens model, of the microscope optical system 30 of this embodiment during magnified observation, that is to say, with the lens 31a removed and the parallel flat plate 31b inserted. The magnification here is 20 times. Paraxial ray trace results in the case where the object-plane field diameter is 0.2 and the image-plane field diameter is 4 are shown in FIGS. 15 and 16. FIG. 15 shows the paraxial ray trace results of the entire microscope optical system 30, and FIG. 16 shows magnified paraxial ray trace results in the vicinity of the object plane.

Table 5 shows sample lens data, obtained from a thin lens model, of the microscope optical system 30 of this embodiment during wide-field observation, that is to say, with the parallel flat plate 31b removed and the lens 31a inserted. The magnification here is 2 times. If the image-plane field diameter is 4, as in the magnified observation described above, the object-plane field diameter is 2. Thus, wide-field observation with an object-plane field of view that is 10 times greater than that during magnified observation is possible.

Figure 17:
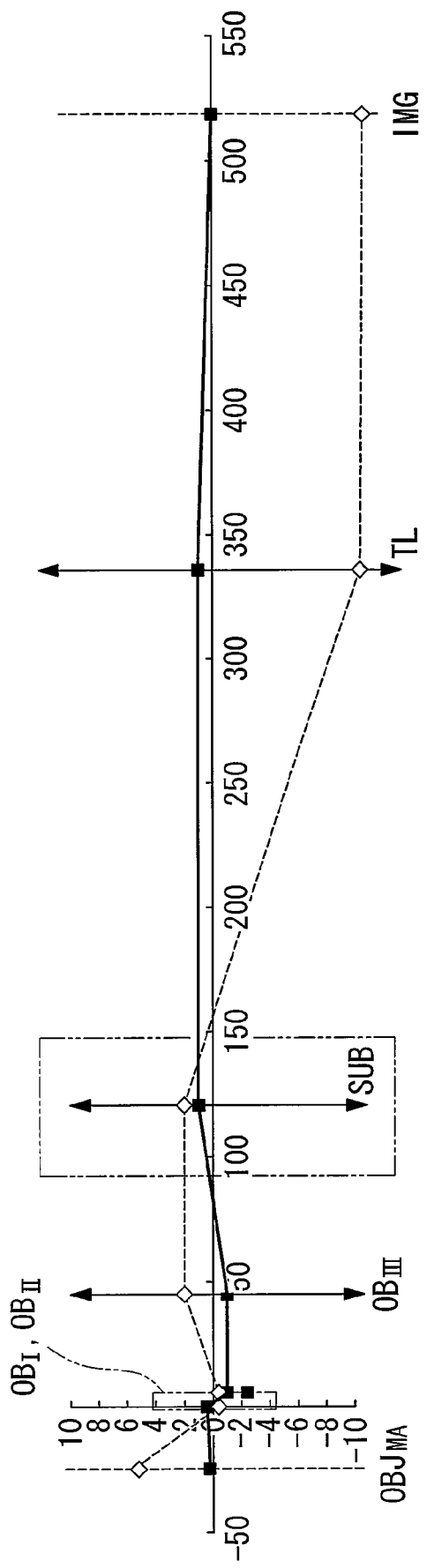
FIG. 17 is a diagram showing paraxial ray-trace results of the Example of the microscope optical system in FIG. 13 during wide-field observation.
Figure 18:
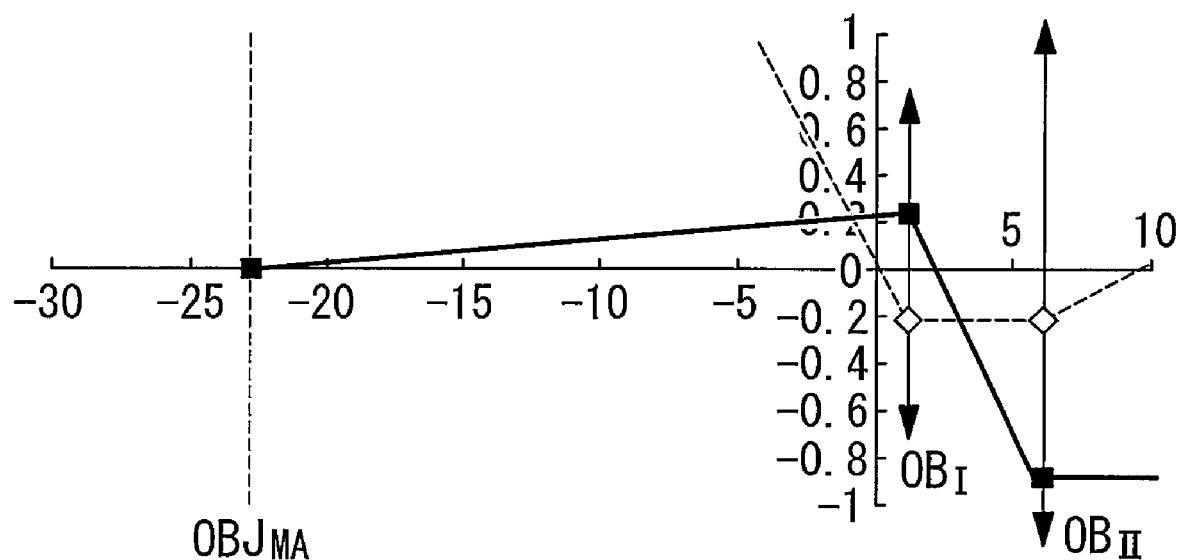
FIG. 18 is a magnified view of the paraxial ray-trace results in FIG. 17 in the vicinity of the object plane.

Paraxial ray trace results for the case where the image-plane field diameter is 20 are shown in FIGS. 17 and 18. FIG. 17 shows the paraxial ray trace results of the entire microscope optical system 30, and FIG. 18 shows the magnified paraxial ray trace results in the vicinity of the object plane. The object-plane field diameter in this case is 10. Thus, wide-field observation with an object-plane field of view that is 50 times greater than that during magnified observation is possible.

Figure 19:
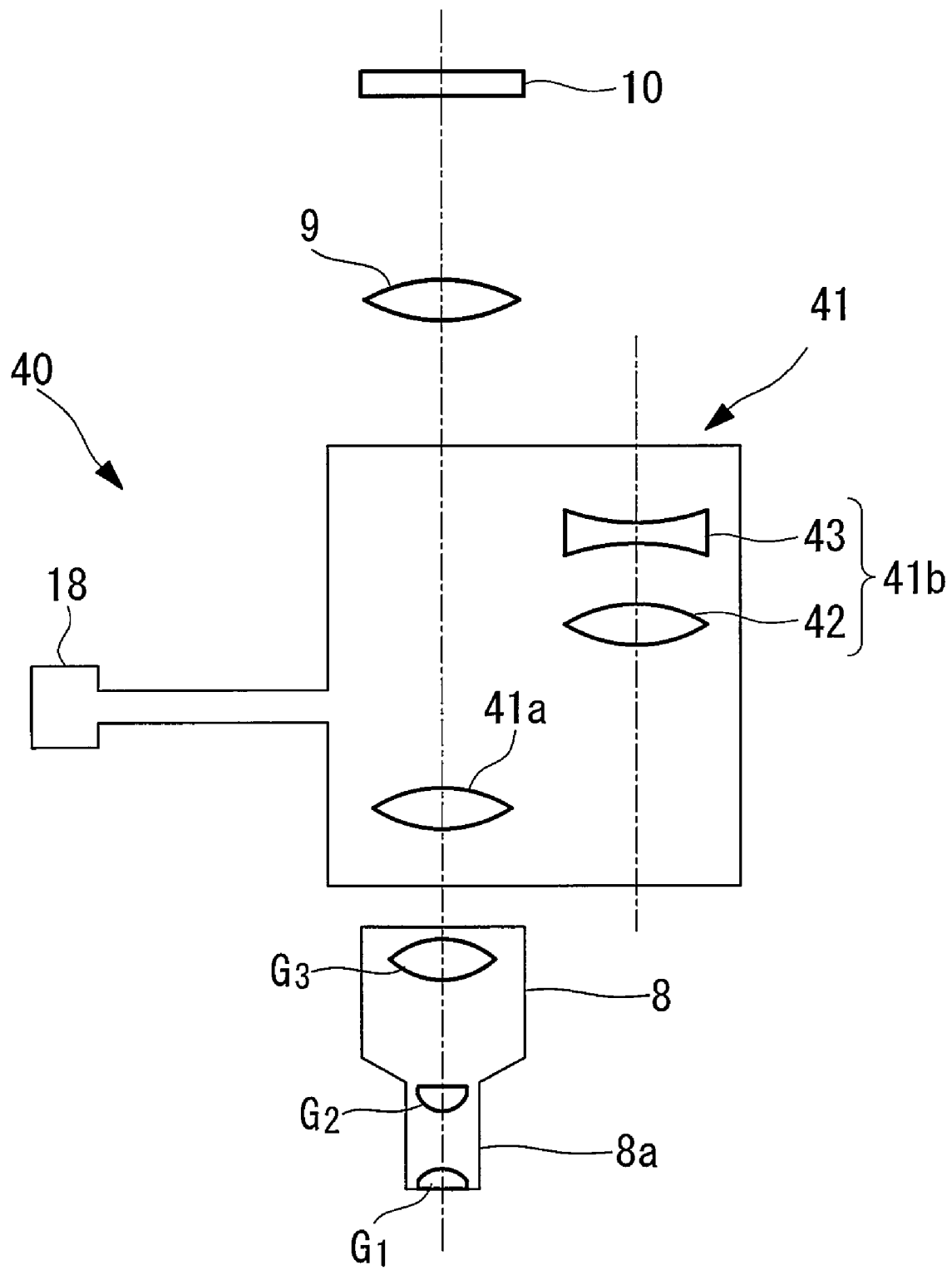
FIG. 19 is a diagram showing, in outline, a microscope apparatus including a microscope optical system according to a third embodiment of the present invention, during wide-field observation.

Next, a microscope optical system 40 according to a third embodiment of the present invention is described below with reference to FIG. 19.

In the description of this embodiment, parts having the same configuration as those in the microscope optical system 30 according to the second embodiment described above are assigned the same reference numerals, and a description thereof shall be omitted here.

The difference between the microscope optical system 40 according to this embodiment and that of the second embodiment is an auxiliary optical system 41. In this embodiment, as shown in FIG. 19, instead of the parallel flat plate 31b in the second embodiment, the auxiliary optical system 41 includes a Galilean afocal optical system 41b including a lens 42 with positive power and a lens 43 with negative power, in this order from the object side.

When the lens 41a (auxiliary optical system) of the auxiliary optical system 41 is inserted in the light path between the objective lens 8 and the image-forming lens 9, the afocal optical system 41b is removed from the light path. On the other hand, when the lens 41a is removed from the light path between the objective lens 8 and the image-forming lens 9, the afocal optical system 41b is inserted at the same position instead of the lens 41a.

Similarly to the second embodiment, the microscope optical system 40 according to this embodiment, having such a configuration, affords an advantage in that it is possible to prevent shifting of the pupil position at the image side due to switching between wide-field observation and magnified observation, without providing the third slider 19 like that in the first embodiment.

EXAMPLE

An Example of the microscope optical system 40 according to this embodiment will be described below with reference to FIGS. 20 to 23 and Tables 6 and 7.

TABLE 6

| NUM-BER n | [SURFACES OR THIN LENSES] NAME | ABBRE-VIATION | FOCAL LENGTH fn | REFRACTIVE POWER ψn | SEPA-RATION dn' | POSITION zn | REFRACTIVE INDEX OF MEDIUM Nn' | CONVERSION DISTANCE en' |
|---|---|---|---|---|---|---|---|---|
| 0 | THE OBJECT PLANE (MICRO) | OBJ$_{MI}$ | — | — | 1 | 0 | 1 | 1 |
| 1 | THE FIRST GROUP OF THE OBJECT LENS | OB$_I$ | 1 | 1 | 5 | 1 | 1 | 5 |
| 2 | THE SECOND GROUP OF THE OBJECT LENS | OB$_{II}$ | 4 | 0.25 | 40 | 6 | 1 | 40 |
| 3 | THE THIRD GROUP OF THE OBJECT LENS | OB$_{III}$ | 36 | 0.027778 | 76.8 | 46 | 1 | 76.8 |
| 4 | THE GROUP OF POSITIVE LENS | LP | 180 | 0.005556 | 90 | 122.8 | 1 | 90 |
| 5 | THE GROUP OF NEGATIVE LENS | LN | −90 | −0.01111 | 34.8 | 212.8 | 1 | 34.8 |
| 6 | THE IMAGE-FORMING LENS | TL | 90 | 0.011111 | 90 | 247.6 | 1 | 90 |
| 7 | THE IMAGE-ACQUISITION SURFACE | IMG | — | — | — | 337.6 | — | — |

TABLE 7

| NUM-BER n | [SURFACES OR THIN LENSES] NAME | ABBRE-VIATION | FOCAL LENGTH fn | REFRACTIVE POWER ψn | SEPA-RATION dn' | POSITION zn | REFRACTIVE INDEX OF MEDIUM Nn' | CONVERSION DISTANCE en' |
|---|---|---|---|---|---|---|---|---|
| 0 | THE OBJECT PLANE (MACRO) | OBJ$_{MA}$ | — | — | 23.5 | −22.5 | 1 | 23.5 |
| 1 | THE FIRST GROUP OF THE OBJECT LENS | OB$_I$ | 1 | 1 | 5 | 1 | 1 | 5 |
| 2 | THE SECOND GROUP OF THE OBJECT LENS | OB$_{II}$ | 4 | 0.25 | 40 | 6 | 1 | 40 |
| 3 | THE THIRD GROUP OF THE OBJECT LENS | OB$_{III}$ | 36 | 0.027778 | 75.6 | 46 | 1 | 75.6 |
| 4 | AUXILIARY LENS | SUB | 36 | 0.027778 | 126 | 121.6 | 1 | 126 |
| 5 | THE IMAGE-FORMING LENS | TL | 90 | 0.011111 | 90 | 247.6 | 1 | 90 |
| 6 | THE IMAGE-ACQUISITION SURFACE | IMG | — | — | — | 337.6 | — | — |

Figure 20:
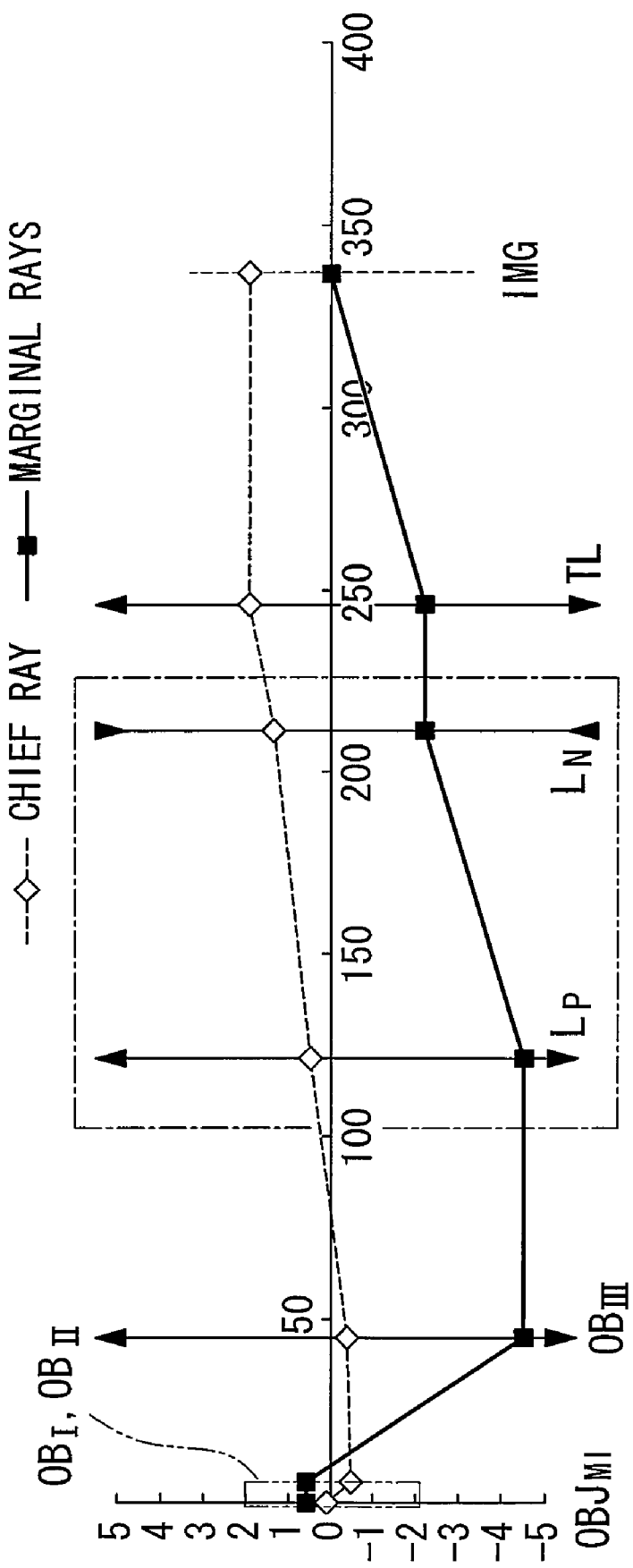
FIG. 20 is a diagram showing paraxial ray-trace results of an Example of the microscope optical system in FIG. 19 during magnified observation.
Figure 21:
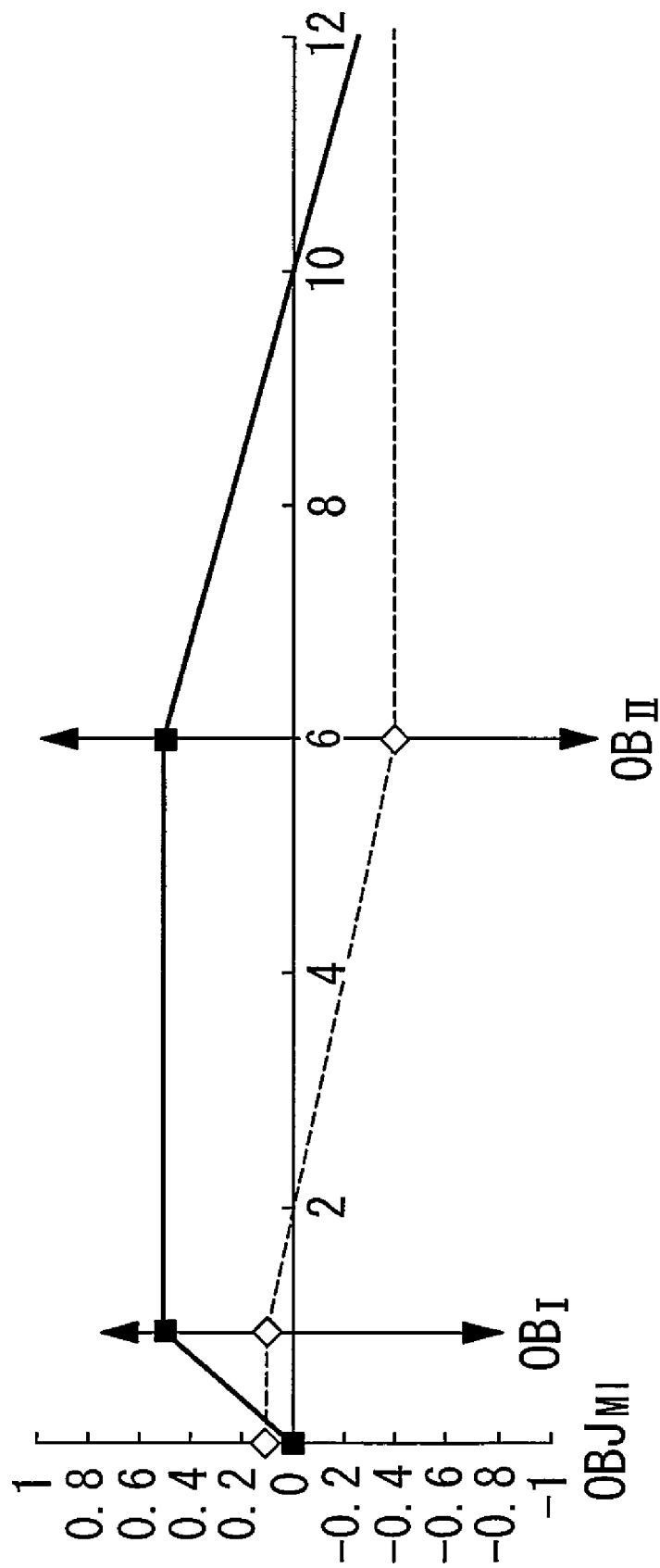
FIG. 21 is a magnified view of the paraxial ray-trace results in FIG. 20 in the vicinity of the object plane.

Table 6 shows sample lens data, obtained from a thin lens model, of the microscope optical system 40 of this embodiment during magnified observation, that is to say, with the lens 41a of the auxiliary optical system 41 removed and the afocal optical system 41b inserted. The magnification here is 20× times. Paraxial ray trace results in the case where the object-plane field diameter is 0.2 and the image-plane field diameter is 4 are shown in FIGS. 20 and 21. FIG. 20 shows the paraxial ray trace results of the entire microscope optical system 40, and FIG. 21 shows the magnified paraxial ray trace results in the vicinity of the object plane.

Table 7 shows sample lens data, obtained from a thin lens model, of the microscope optical system 40 in this embodiment during wide-field observation, that is to say, with the afocal optical system 41b removed and the lens 41a inserted. The magnification here is 2 times. If the image-plane field diameter is set to 4, as in the magnified observation described above, the object-plane field diameter is 4. Thus, wide-field observation with an object-plane field of view that is 20 times greater than that during magnified observation is possible.

Figure 22:
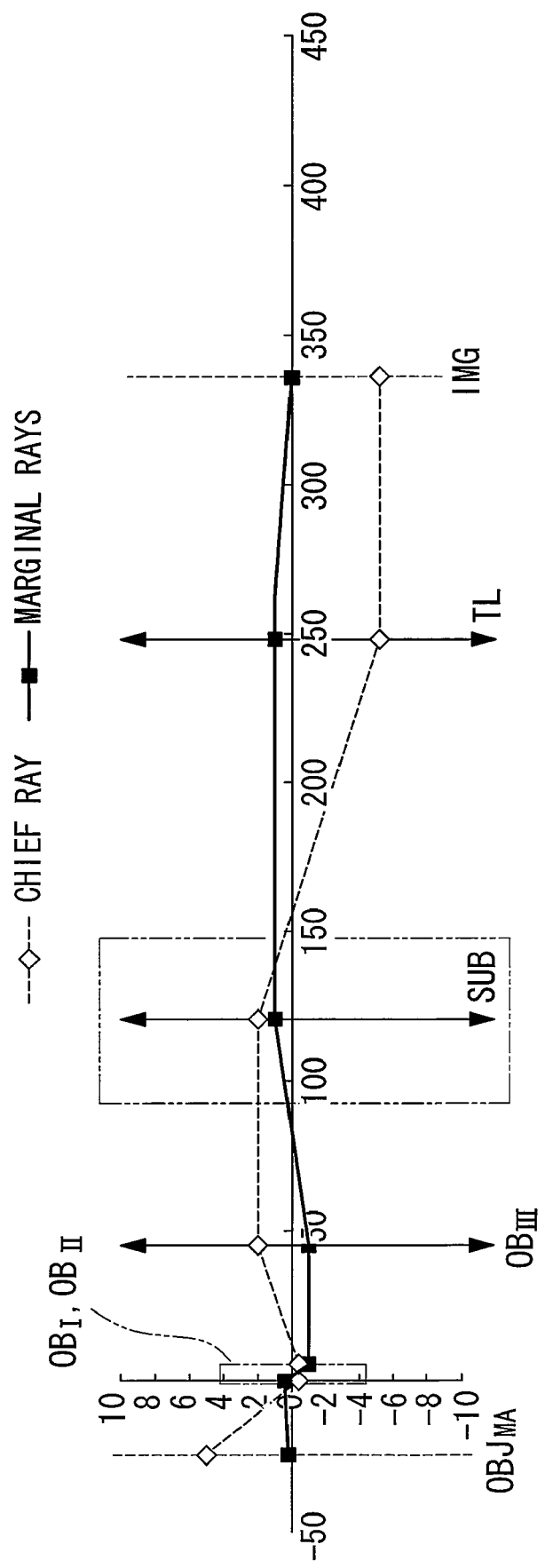
FIG. 22 is a diagram showing paraxial ray-trace results of the Example of the microscope optical system in FIG. 19 during wide-field observation.
Figure 23:
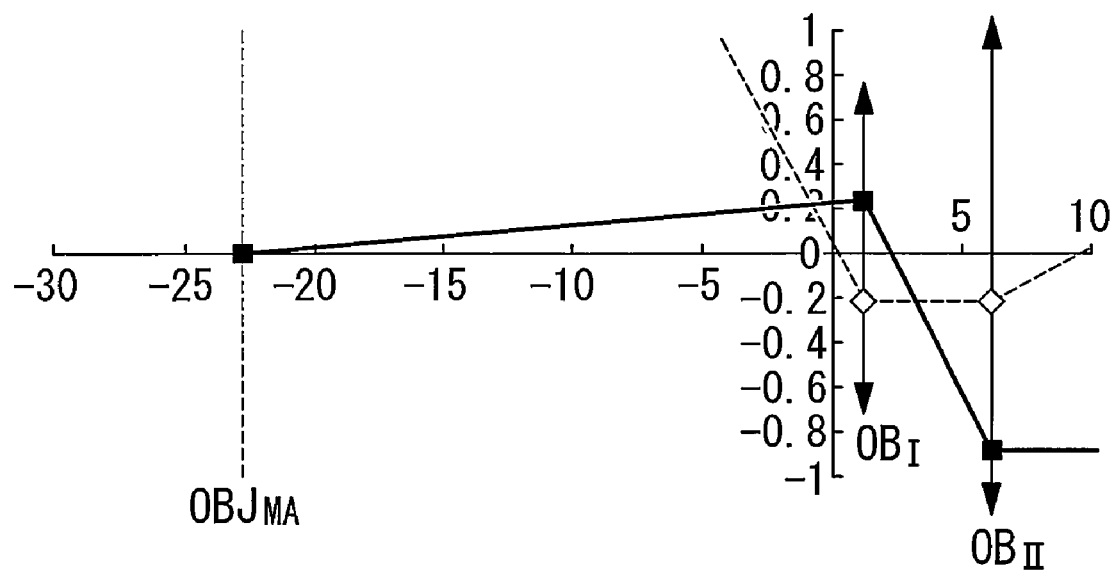
FIG. 23 is a magnified view of the paraxial ray-trace results in FIG. 22 in the vicinity of the object plane.

Paraxial ray trace results in the case where the image-plane field diameter is 10 are shown in FIGS. 22 and 23. FIG. 22 shows the paraxial ray trace results for the entire microscope optical system 40, and FIG. 23 shows magnified paraxial ray trace results in the vicinity of the object plane. The object-plane field diameter in this case is 10. Thus, wide-field observation with an object-plane field of view that is 50 times greater than that during the above-described magnified observation is possible.

Figure 24:
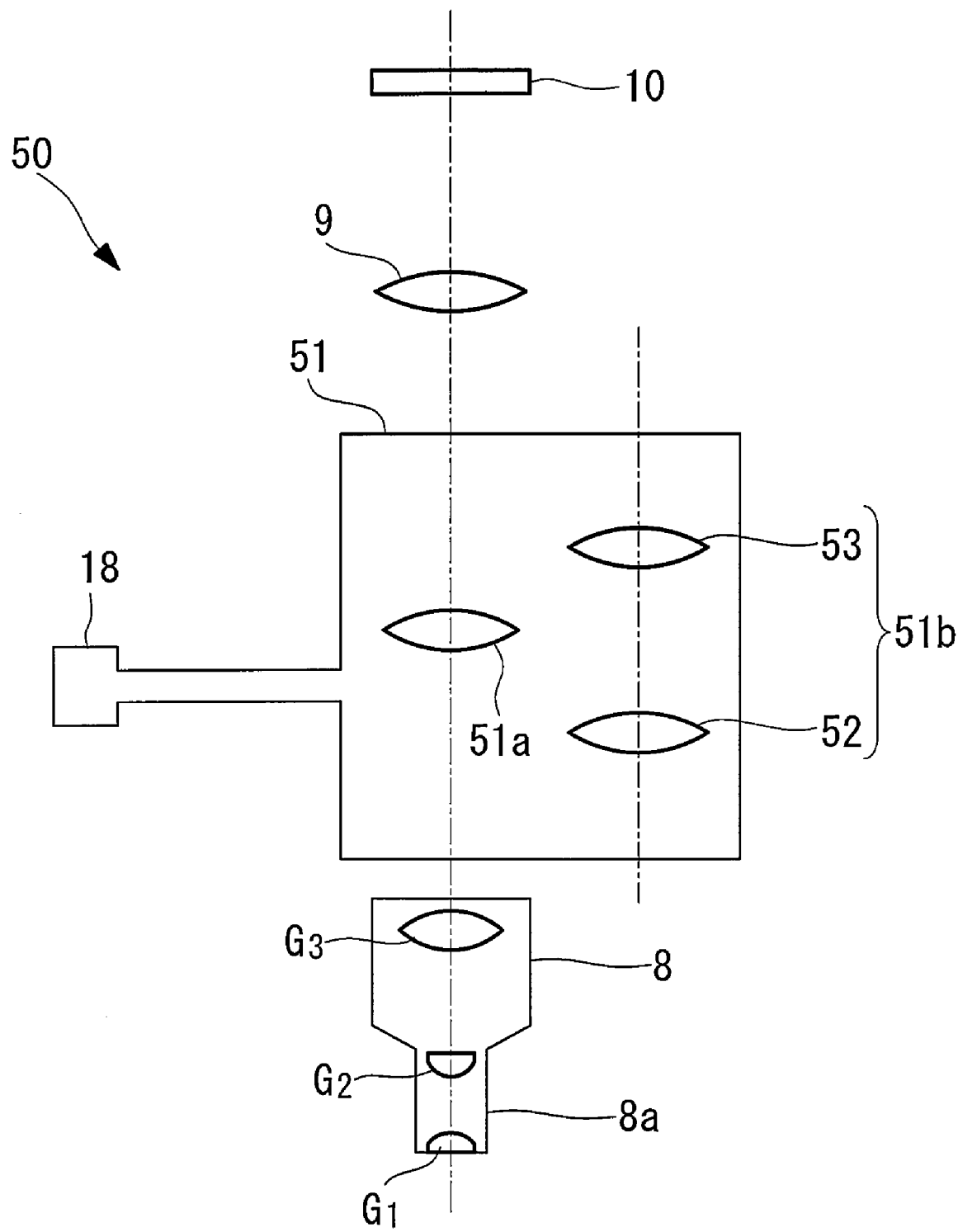
FIG. 24 is a diagram showing, in outline, a microscope apparatus including a microscope optical system according to a fourth embodiment of the present invention, during wide-field observation.

Next, a microscope optical system 50 according to a fourth embodiment of the present invention is described below with reference to FIG. 24.

In the description of this embodiment, parts having the same configuration as those in the microscope optical system 30 according to the second embodiment described above are assigned the same reference numerals, and a description thereof shall be omitted here.

The difference between the microscope optical system 50 according to this embodiment and the second embodiment is an auxiliary optical system 51. In this embodiment, as shown in FIG. 24, instead of the parallel flat plate 31b in the second embodiment, the auxiliary optical system 51 includes a Keppler afocal optical system including two lenses 52 and 53 having positive power, which are separated from each other by a gap.

When the lens 51a of the auxiliary optical system 51 is inserted in the light path between the objective lens 8 and the image-forming lens 9, the afocal optical system 51b is removed from the light path. On the other hand, when the lens 51a is removed from the light path between the objective lens 8 and the image-forming lens 9, the afocal optical system 51b is inserted at the same position instead of the lens 51a.

Similarly to the second and third embodiments, the microscope optical system 50 according to this embodiment, having such a configuration, affords an advantage in that it is possible to prevent shifting of the pupil position at the image side due to switching between wide-field observation and magnified observation, without providing the third slider 19 like that in the first embodiment.

EXAMPLE

An Example of the microscope optical system 50 according to this embodiment will be described below with reference to FIGS. 25 to 28 and Tables 8 and 9.

TABLE 8

| NUMBER n | [SURFACES OR THIN LENSES] NAME | ABBREVIATION | FOCAL LENGTH $f_n$ | REFRACTIVE POWER $\psi_n$ | SEPARATION $d_n'$ | POSITION $z_n$ | REFRACTIVE INDEX OF MEDIUM $N_n'$ | CONVERSION DISTANCE $e_n'$ |
|---|---|---|---|---|---|---|---|---|
| 0 | THE OBJECT PLANE (MICRO) | $OBJ_{MI}$ | — | — | 1 | 0 | 1 | 1 |
| 1 | THE FIRST GROUP OF THE OBJECT LENS | $OB_I$ | 1 | 1 | 5 | 1 | 1 | 5 |
| 2 | THE SECOND GROUP OF THE OBJECT LENS | $OB_{II}$ | 4 | 0.25 | 40 | 6 | 1 | 40 |
| 3 | THE THIRD GROUP OF THE OBJECT LENS | $OB_{III}$ | 36 | 0.027778 | 78.525 | 46 | 1 | 78.525 |
| 4 | THE FIRST GROUP OF POSITIVE LENS | LP1 | 42.525 | 0.023516 | 85.05 | 124.525 | 1 | 85.05 |
| 5 | THE SECOND GROUP OF POSITIVE LENS | LP2 | 42.525 | 0.023516 | 222.525 | 209.575 | 1 | 222.525 |
| 6 | THE IMAGE-FORMING LENS | TL | 180 | 0.005556 | 180 | 432.1 | 1 | 180 |
| 7 | THE IMAGE-ACQUISITION SURFACE | IMG | — | — | — | 612.1 | — | — |

TABLE 9

| NUMBER n | [SURFACES OR THIN LENSES] NAME | ABBREVIATION | FOCAL LENGTH $f_n$ | REFRACTIVE POWER $\psi_n$ | SEPARATION $d_n'$ | POSITION $z_n$ | REFRACTIVE INDEX OF MEDIUM $N_n'$ | CONVERSION DISTANCE $e_n'$ |
|---|---|---|---|---|---|---|---|---|
| 0 | THE OBJECT PLANE (MACRO) | $OBJ_{MA}$ | — | — | 11 | −10 | 1 | 11 |
| 1 | THE FIRST GROUP OF THE OBJECT LENS | $OB_I$ | 1 | 1 | 5 | 1 | 1 | 5 |
| 2 | THE SECOND GROUP OF THE OBJECT LENS | $OB_{II}$ | 4 | 0.25 | 40 | 6 | 1 | 40 |
| 3 | THE THIRD GROUP OF THE OBJECT LENS | $OB_{III}$ | 36 | 0.027778 | 125.1 | 46 | 1 | 125.1 |
| 4 | AUXILIARY LENS | SUB | 81 | 0.012346 | 261 | 171.1 | 1 | 261 |
| 5 | THE IMAGE-FORMING LENS | TL | 180 | 0.005556 | 180 | 432.1 | 1 | 180 |
| 6 | THE IMAGE-ACQUISITION SURFACE | IMG | — | — | — | 612.1 | — | — |

Figure 25:
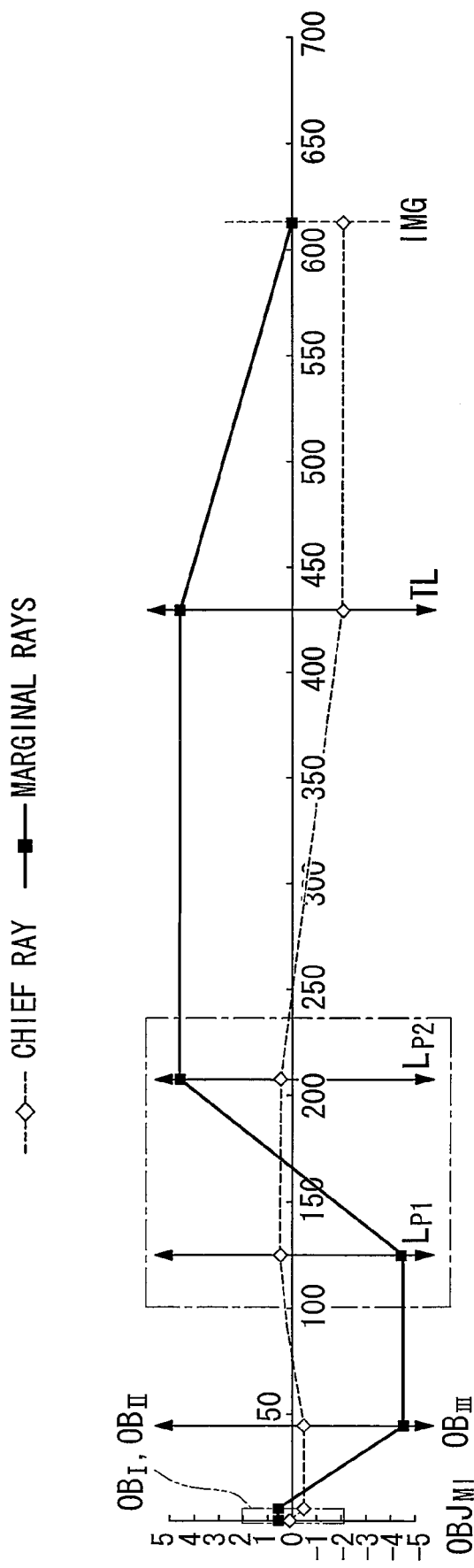
FIG. 25 is a diagram showing paraxial ray-trace results of an Example of the microscope optical system in FIG. 24 during magnified observation.
Figure 26:
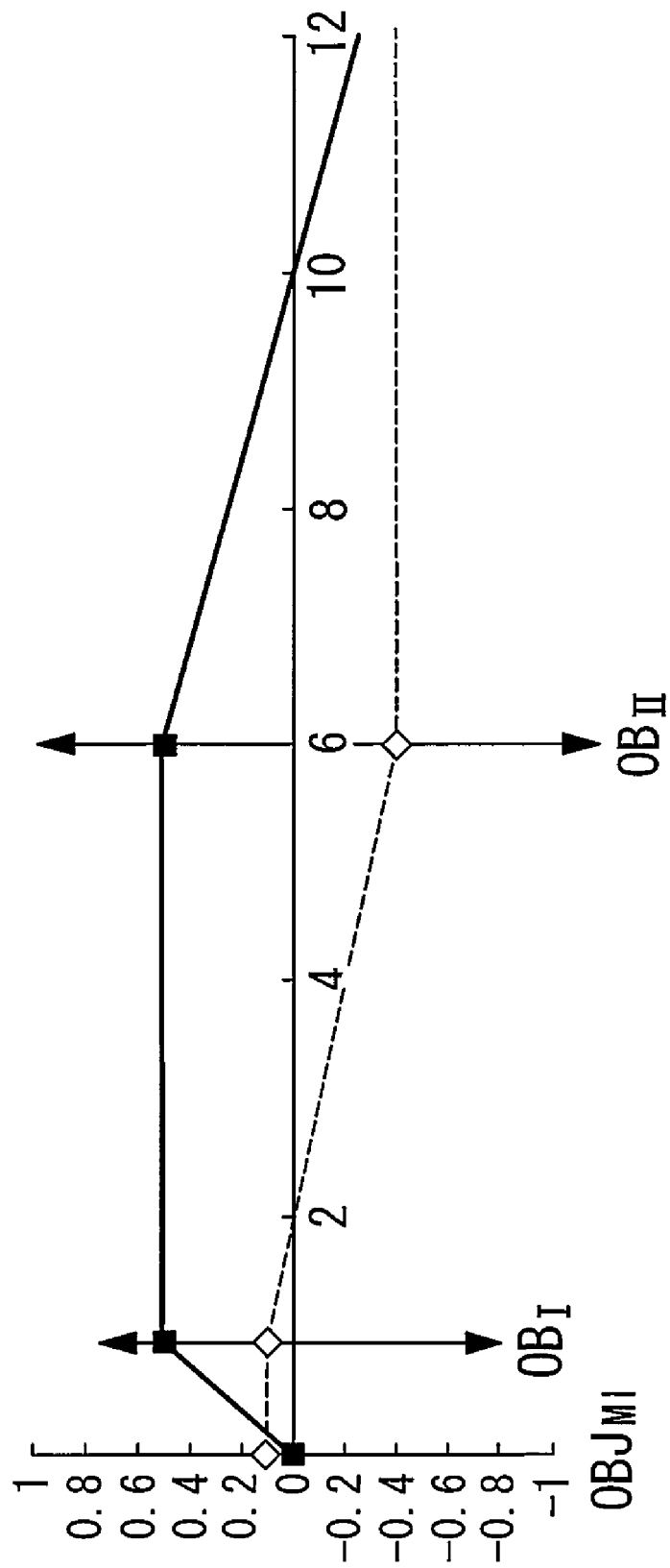
FIG. 26 is a magnified view of the paraxial ray-trace results in FIG. 25 in the vicinity of the object plane.

Table 8 shows sample lens data, obtained from a thin lens model, of the microscope optical system 50 of this embodiment during magnified observation, that is to say, with the lens 51a of the auxiliary optical system 51 removed and the afocal optical system 51b inserted. The magnification here is 20 times. Paraxial ray trace results of the case where the object-plane field diameter is 0.2 and the image-plane field diameter is 4 are shown in FIGS. 25 and 26. FIG. 25 shows the paraxial ray trace results for the entire microscope optical system 50, and FIG. 26 shows the magnified paraxial ray trace results in the vicinity of the object plane.

Table 9 shows sample lens data, obtained from a thin lens model, of the microscope optical system 50 of this embodiment during wide-field observation, that is to say, with the afocal optical system 51b removed and the lens 51 inserted. The magnification here is 1 (unity). If the image-plane field diameter is set to 4, as in the above-described magnified observation, the object-plane field diameter is 2. Thus, wide-field observation with an object-plane field of view that is 10 times greater than that during the above-described magnified observation is possible.

The difference between the microscope optical system 60 according to this embodiment and the first embodiment is an auxiliary optical system 61.

Figure 29:
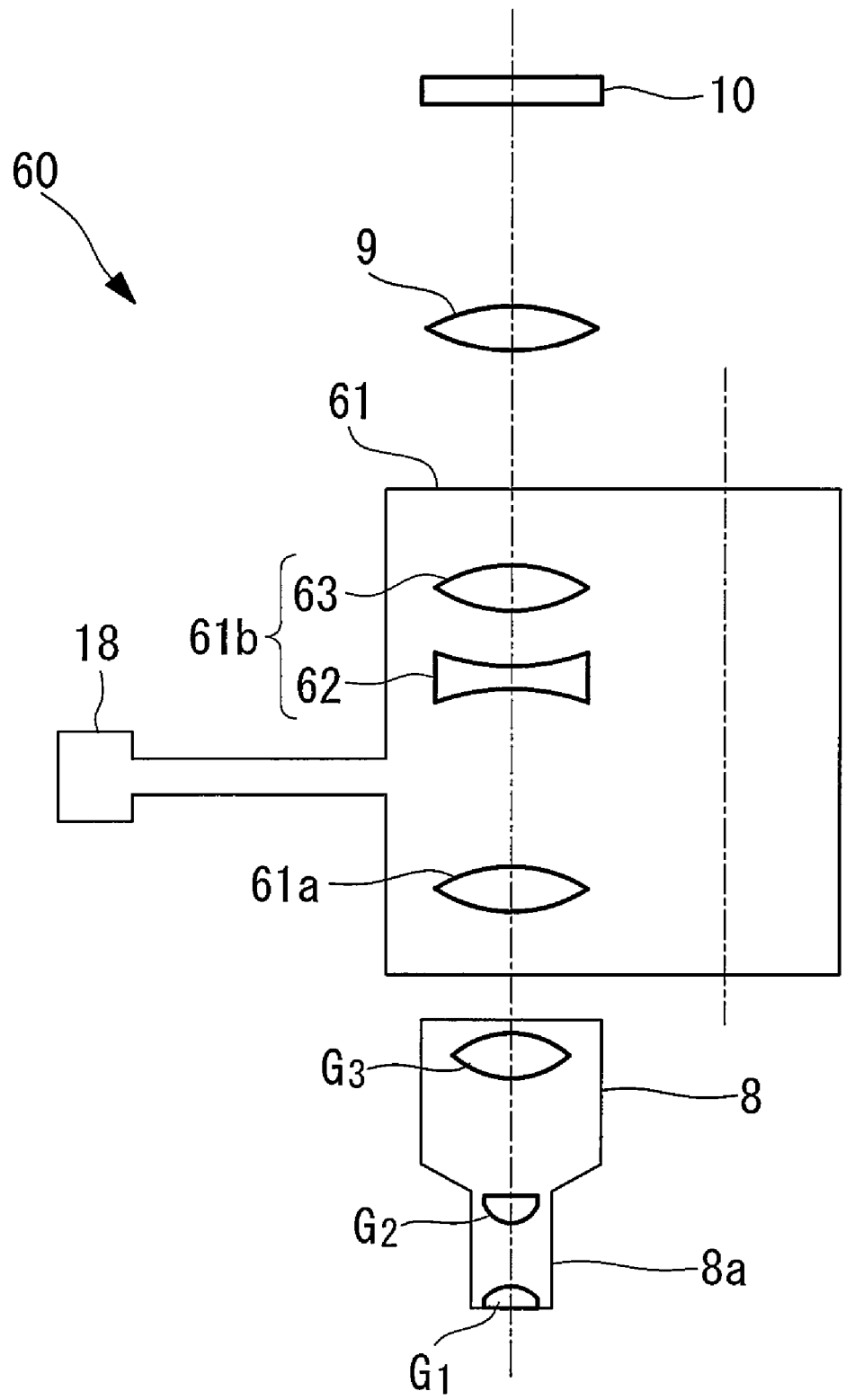
FIG. 29 is a diagram showing, in outline, the overall configuration of a microscope apparatus including a microscope optical system according to a fifth embodiment of the present invention, during wide-field observation.

In this embodiment, as shown in FIG. 29, the auxiliary optical system 61 includes a lens 61a like that in the first embodiment, having positive power, and in series therewith, a reverse-Galilean afocal optical system 61b in which a lens 62 having negative power and a lens 63 having positive power are arranged in this order from the object side.

Similarly to the second to fourth embodiments, the microscope optical system 60 according to this embodiment, having such a configuration, affords an advantage in that it is possible to prevent shifting of the pupil position at the image side due to switching between wide-field observation and magnified observation, without providing the third slider 19 like that in the first embodiment.

EXAMPLE

Figure 30:
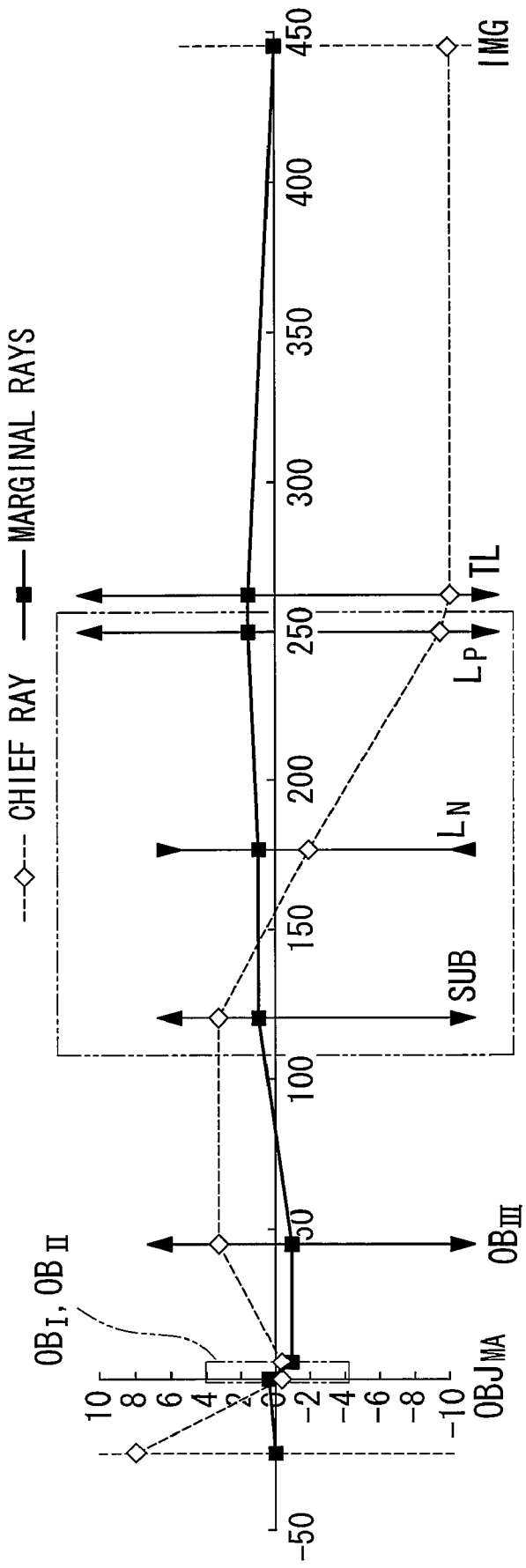
FIG. 30 is a diagram showing paraxial ray-trace results of an Example of the microscope optical system in FIG. 29 during wide-field observation.
Figure 31:
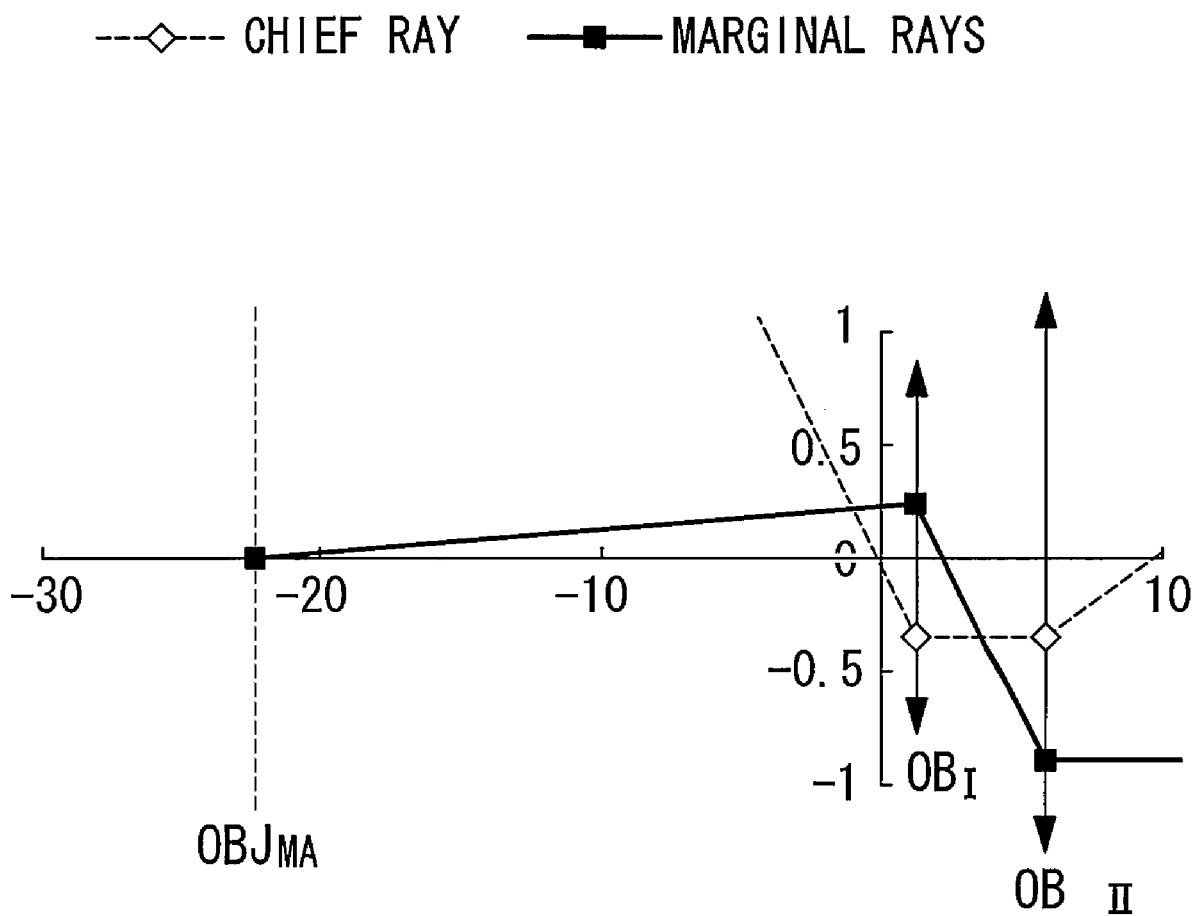
FIG. 31 is a magnified view of the paraxial ray-trace results in FIG. 30, in the vicinity of the object plane.

An Example of the microscope optical system 60 according to this embodiment will be described below with reference to FIGS. 30 and 31 and Table 10.

TABLE 10

| NUM-BER n | [SURFACES OR THIN LENSES] NAME | ABBRE-VIATION | FOCAL LENGTH $f_n$ | REFRACTIVE POWER $\psi_n$ | SEPA-RATION $d_n'$ | POSITION $z_n$ | REFRACTIVE INDEX OF MEDIUM $N_n'$ | CON-VERSION DISTANCE $e_n'$ |
|---|---|---|---|---|---|---|---|---|
| 0 | THE OBJECT PLANE (MACRO) | $OBJ_{MA}$ | — | — | 23.5 | −22.5 | 1 | 23.5 |
| 1 | THE FIRST GROUP OF THE OBJECT LENS | $OB_I$ | 1 | 1 | 5 | 1 | 1 | 5 |
| 2 | THE SECOND GROUP OF THE OBJECT LENS | $OB_{II}$ | 4 | 0.25 | 40 | 6 | 1 | 40 |
| 3 | THE THIRD GROUP OF THE OBJECT LENS | $OB_{III}$ | 36 | 0.027778 | 75.6 | 46 | 1 | 75.6 |
| 4 | AUXILIARY LENS | SUB | 36 | 0.027778 | 56.77 | 121.6 | 1 | 56.77 |
| 5 | THE GROUP OF NEGATIVE LENS | LN | −120 | −0.00833 | 72 | 178.37 | 1 | 72 |
| 6 | THE GROUP OF POSITIVE LENS | LP | 192 | 0.005208 | 11.63 | 250.37 | 1 | 11.63 |
| 7 | THE IMAGE-FORMING LENS | TL | 180 | 0.005556 | 180 | 262 | 1 | 180 |
| 8 | THE IMAGE-ACQUISITION SURFACE | IMG | — | — | — | 442 | — | — |

Figure 27:
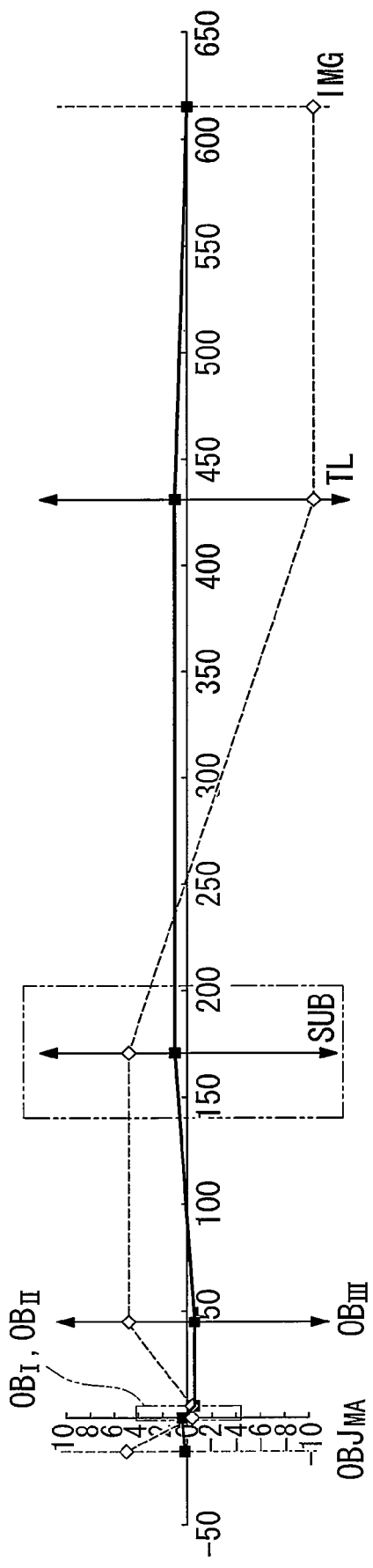
FIG. 27 is a diagram showing paraxial ray-trace results of the Example of the microscope optical system in FIG. 24 during wide-field observation.
Figure 28:
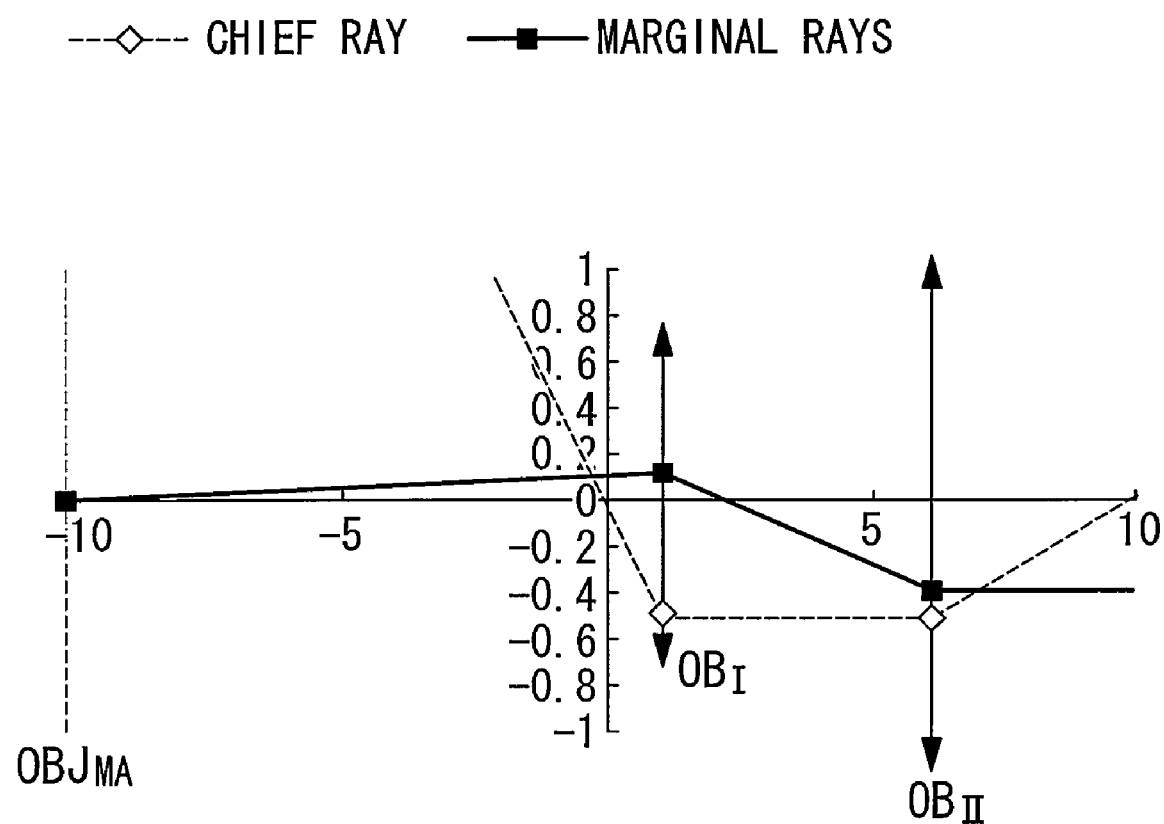
FIG. 28 is a magnified view of the paraxial ray-trace results in FIG. 25 in the vicinity of the object plane.

Paraxial ray trace results of the case where the image-plane field diameter is 20 are shown in FIGS. 27 and 28. FIG. 27 shows the paraxial ray trace results for the entire microscope optical system 50, and FIG. 28 shows the magnified paraxial ray trace results in the vicinity of the object plane. The object-plane field diameter in this case is 10. Thus, wide-field observation with an object-plane field of view that is 50 times greater than that during the above-described magnified observation is possible.

Next, a microscope optical system 60 according to a fifth embodiment of the present invention is described below with reference to FIG. 29.

In the description of this embodiment, parts having the same configuration as those in the microscope optical system 30 according to the second embodiment described above are assigned the same reference numerals, and a description thereof shall be omitted here.

Table 10 shows sample lens data, obtained from a thin lens model, of the microscope optical system 60 of this embodiment during wide-field observation, that is to say, with the auxiliary optical system 61 inserted. The magnification here is 1.25 times. If the image-plane field diameter is set to 4, the object-plane field diameter is 3.2, and wide-field observation is thus possible. Paraxial ray trace results of the case where the image-plane field diameter is 20 are shown in FIGS. 30 and 31. FIG. 30 shows the paraxial ray trace results for the entire microscope optical system 60, and FIG. 31 shows the magnified paraxial ray trace results in the vicinity of the object plane. The object-plane field diameter in this case is 16, and wide-field observation is thus possible.

The lens data of the microscope optical system 60 of this embodiment during magnified observation, that is to say, with the auxiliary optical system 61 removed, as well as the paraxial ray trace results thereof, are the same as the Example in the first embodiment and are thus not shown here.

In the microscope optical systems according to the embodiments described above, a description has been given of the case where an image is acquired with the image-acquisition device 10, such as a CCD. However, the present invention is not limited thereto; it may also be used in a scanning microscope that scans using a galvanometer mirror.

In the embodiments described above, because the image-forming relationship changes by inserting and removing the auxiliary optical systems 11, 31, 41, 51, and 61, there is a possibility that the image displayed on the monitor will be inverted. Therefore, in order to correct for this, inversion correcting apparatus (not shown in the drawings), such as an image rotator, may be provided. The inversion correcting apparatus may correct the inversion of the displayed image by image processing, or it may correct it mechanically, for example, by rotating the image-acquisition device 10. In the case of a scanning microscope, inversion of the acquired image may be prevented using a method involving changing the scanning direction of the galvanometer mirror.

The center-position indicating apparatus 14 described above is a marker in the auxiliary optical system; however, it is not limited thereto. It is also acceptable to display crosshairs or the like on the image displayed on the monitor during wide-field observation, using image processing.

It is also possible to provide immersion apparatus (not shown in the drawing) for supplying a liquid such as water or immersion oil between the tip of the objective lens 8 and the examination site B. In such a case, when switching from wide-field observation to magnified observation, by operating the immersion apparatus, it is preferable to supply the liquid between the tip of the objective lens 8 and the examination site B and to carry out observation with the objective lens 8 immersed in the liquid.

Figure 32:
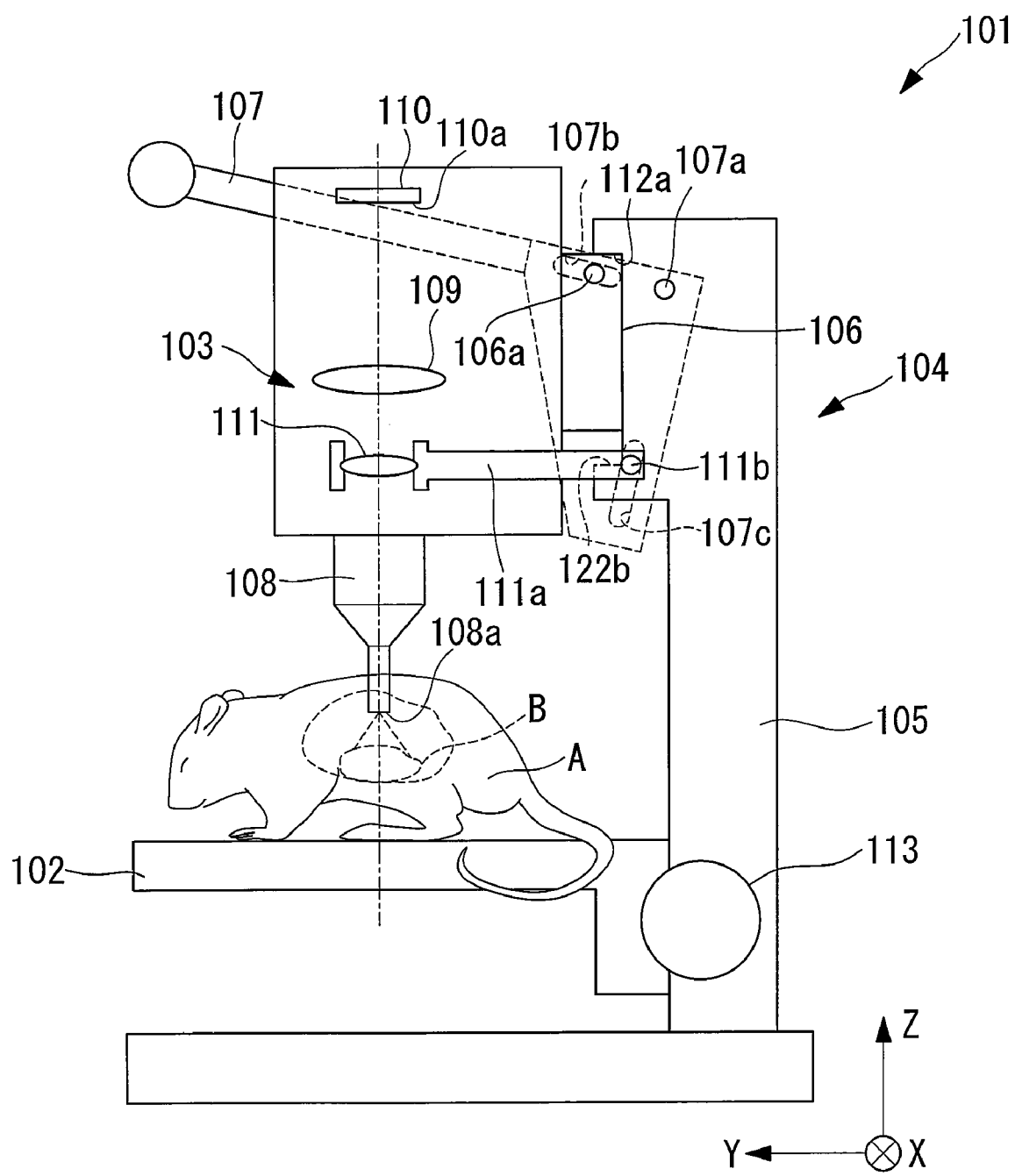
FIG. 32 is a diagram showing, in outline, the configuration of a microscope apparatus according to a sixth embodiment of the present invention, during wide-field observation.
Figure 33:
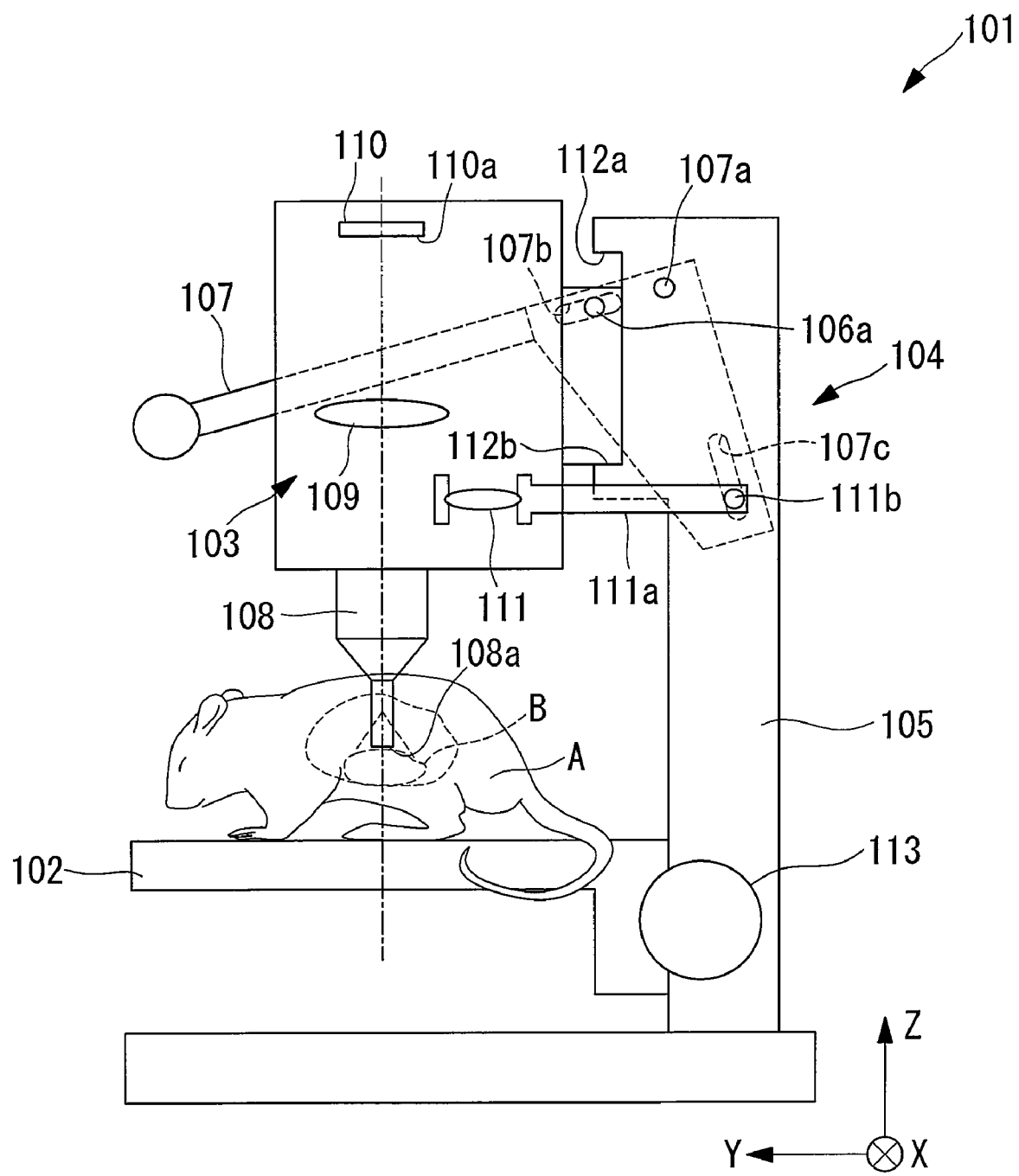
FIG. 33 is a diagram showing, in outline, the configuration of the microscope apparatus in FIG. 32 during magnified observation.
Figure 34:
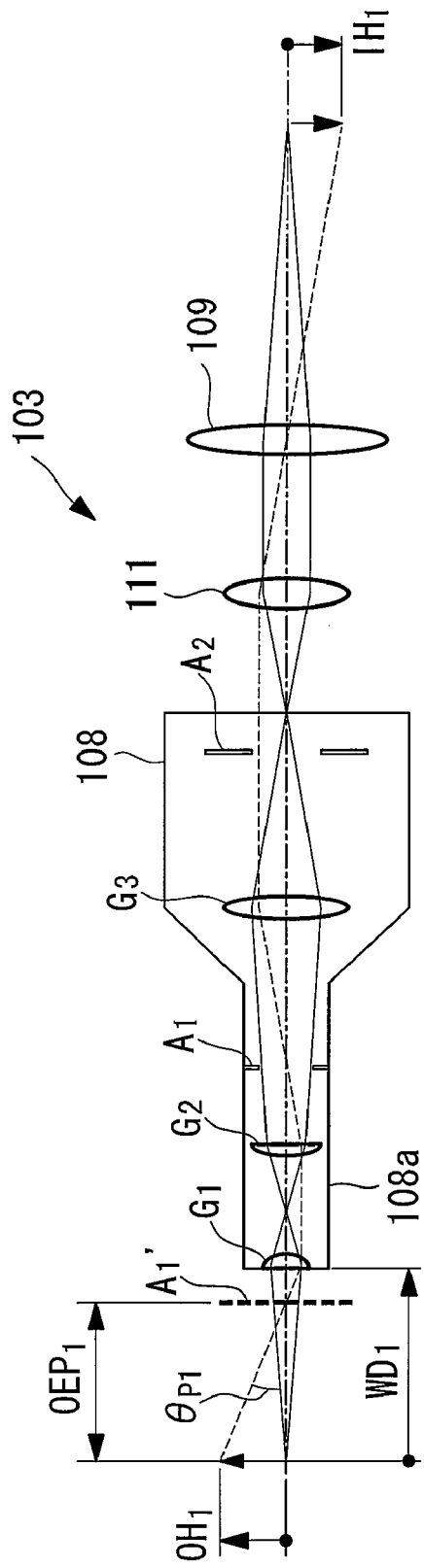
FIG. 34 is a diagram for explaining a change in working distance and field semidiameter of the microscope optical system in FIG. 32, during wide-field observation.
Figure 35:
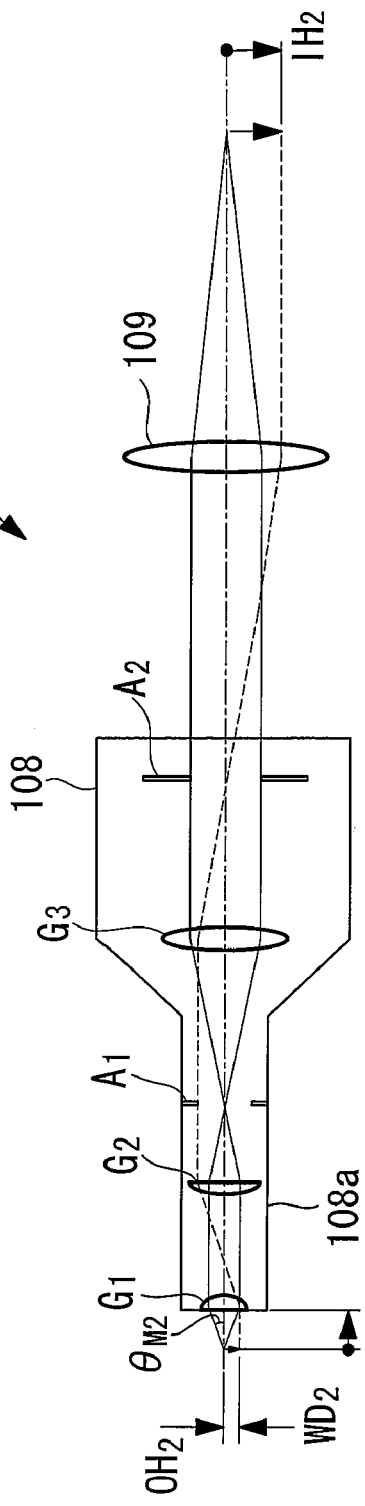
FIG. 35 is a diagram for explaining a change in working distance and field semidiameter of the microscope optical system in FIG. 32, during magnified observation.

A microscope apparatus 101 according to a sixth embodiment of the present invention will be described below with reference to FIGS. 32 to 35. FIGS. 32 and 34 show low-magnification wide-field observation, and FIGS. 33 and 35 show high-magnification observation.

As shown in FIG. 32, the microscope apparatus 101 according to this embodiment includes a stage 102 for mounting a small laboratory animal serving as the specimen A, a microscope optical system 103, and a moving mechanism 104 for moving the microscope optical system 103 upward and downward relative to the stage 102.

The moving mechanism 104 includes a support stand 105 extending vertically from the stage 102 and a slider 106 provided so as to be capable of moving up and down on the support stand 105. The slider 106 is moved up and down relative to the stage 102 by operating a handle (interlocking device) 107. The microscope optical system 103 is attached to the slider 106.

The microscope optical system 103 according to this embodiment includes an objective lens 108, having a narrow-diameter end portion 108a that is inserted inside the small laboratory animal serving as the specimen A through an incision made therein, for collecting light from the examination site B on an internal organ or the like; an image-forming lens 109 for converging the light collected by the objective lens 108 to form an image; an image-acquisition device 110, such as a CCD, whose image-acquisition surface 110a is disposed at the position of the image formed by the image-forming lens 109; and an auxiliary optical system 111 which can be inserted in and removed from the light path between the objective optical system 108 and the image-forming lens 109.

As shown in FIG. 35, the objective lens 108 includes a first group $G_1$ for collecting light from a single point on the examination site B of the specimen A and converting it to substantially collimated light; a second group $G_2$ for converging the substantially collimated light to form an intermediate image; an aperture $A_1$ located at the intermediate image plane to function as a field stop; a third group $G_3$ for collecting the light forming the intermediate image and converting it to substantially collimated light; and an aperture $A_2$ located after the third group $G_3$ to function as an aperture stop. Accordingly, it is possible to transmit the light while maintaining a narrow beam diameter, which allows the outer diameter of the narrow-diameter end portion 108a to be kept small. The objective lens 108 is disposed at the lowermost end of the microscope optical system 103 with the optical axis thereof oriented vertically.

In this embodiment, the auxiliary optical system 111 is a lens having a prescribed positive power. Therefore, as shown in FIG. 34, when the auxiliary optical system 111 is inserted in the light path between the objective lens 108 and the image-forming lens 109, the image-forming relationship changes when compared to the case in which the auxiliary optical system 111 is removed from the light path, as shown in FIG. 35.

The low-magnification wide-field observation achieved by changing the image-forming relationship in this way will be described in more detail below.

In FIG. 34 and FIG. 35, $OH_1$ and $OH_2$ represent the maximum observable object heights (in other words, the field semidiameters) at the object-side focal plane, and $IH_1$ and $IH_2$ represent the maximum image heights at the image-acquisition surface 110a of the image-acquisition device 110. Marginal rays coming from the center of the field (the on-axis object point) at the object-side focal plane and entering microscope optical system 103 are indicated by solid lines, and a chief ray coming from a single point (extreme off-axis object point) at the extreme edge of the field on the object-side focal plane and entering the microscope optical system 103 is indicated by a broken line.

As shown in FIG. 35, when the auxiliary optical system 111 is removed, the working distance is short. Therefore, a plane separated from the tip of the objective lens 108 by a working distance $WD_2$ is the object-side focal plane, and the field semidiameter $OH_2$ is magnified and projected to the maximum image height $IH_2$ by the microscope optical system 103. At this time, the chief ray entering the microscope optical system 103 from the off-axis object point is parallel to the optical axis. This means that, when the auxiliary optical system 111 is removed, the microscope optical system 103 is telecentric at the object side.

The field diameter in this case does not exceed the diameter of the narrow-diameter end portion 108a. In other words, so long as the optical system is telecentric at the object side, the field of view thereof is limited by the diameter of the optical system.

Next, as shown in FIG. 34, the working distance is increased when the auxiliary optical system 111 is inserted. Thus, a plane that is separated from the tip of the objective lens 108 by the working distance $WD_1$ is the object-side focal plane. At the same time, opposite the case shown in FIG. 35, the aperture $A_1$ serves as the aperture stop, and the aperture $A_2$ serves as the field stop. As a result, a projected image $A_1'$ of the aperture $A_1$ between the object-side focal plane and the first group $G_1$ is the entrance pupil of the microscope optical system 103. At this time, the chief ray entering the microscope optical system 103 from the off-axis object point is inclined. This means that, when the auxiliary optical system 111 is inserted, the microscope optical system 103 is non-telecentric at the object side.

When angle of incidence of the chief ray entering the microscope optical system 103 from the extreme off-axis object point in this case is $\theta_{P1}$ the field semidiameter $OH_1$ is given by the following expression, provided that there is no vignetting of the chief ray in the image-forming lens 109, the image-acquisition device 110, and the auxiliary optical system 111:

$$OH_1 = OEP_1 \cdot \tan \theta_{P1} \quad (2)$$

Here, $OEP_1$ is the distance from the object plane to the entrance pupil $A_1'$ and can be arbitrarily set in the design depending on the power and arrangement of the auxiliary optical system 111.

The angle $\theta_{P1}$ of the chief ray is given by the following expression:

$$\theta_{P1} = \theta_{M2} \quad (3\text{-}1)$$

Here, $\theta_{M2}$ is the angle of the marginal ray entering the microscope optical system 103 from the on-axis object point during high-magnification observation, as shown in FIG. 35.

Expression (3-1) describes the angles when using the objective lens 108 as a dry system in both the low-magnification wide-field observation and the high-magnification observation, but when using the objective lens as a liquid immersion system in high-magnification observation, the angles are described by the following expression which takes account of the refractive index of the liquid-immersion medium:

$$\sin \theta_{P1} = n_L \cdot \sin \theta_{M2L} = NA_{2L}$$

therefore, $$\theta_{P1} = \sin^{-1}(n_L \cdot \sin \theta_{M2L}) = \sin^{-1} NA_{2L} \quad (3\text{-}2)$$

Here, $n_L$ is the refractive index of the liquid-immersion medium, $\theta_{M2L}$ is the angle of the marginal ray entering the microscope optical system 103 from the on-axis object point in high-magnification observation due to the liquid immersion system, and $NA_{2L}$ is the object-side numerical aperture of the microscope optical system 103 during high-magnification observation due to the liquid immersion.

The above described the change in the image-forming relationship by inserting the auxiliary optical system 111. In the low-magnification wide-field observation achieved by utilizing this change, it is possible to perform observation over a wide field of view without being restricted to the diameter of the objective lens.

For example, consider the case where low-magnification wide-field observation with $OEP_1 = 5$ mm is performed using a lens having a numerical aperture $NA_{2L} = 0.5$ as the objective lens 108. In this case, the field semidiameter $OH_1$ from expressions (2) and (3-2) above is:

$$\theta_{P1} = \sin^{-1} 0.5 = 30°$$

$$OH_1 = OEP_1 \cdot \tan \theta_{P1} = 5 \cdot \tan 30° = 2.89 \text{(mm)}$$

In other words, a field of view with a diameter of 5.78 mm can be observed.

No matter how much the diameter of the objective lens used is reduced, or how much the magnification is increased during high-magnification observation, thus narrowing the field of view, a field of view with the same size can be observed so long as the conditions for $NA_{2L}$ and $OEP_1$ described above are satisfied.

Naturally, it is possible to obtain a wider field of view, by using an objective lens having a larger $NA_{2L}$ or by setting $OEP_1$ to a larger distance.

Next, the change in working distance produced by inserting and removing the auxiliary optical system 111 will be described. As shown in FIG. 34, the working distance is $WD_1$ when the auxiliary optical system 111 is inserted.

On the other hand, as shown in FIG. 35, when the auxiliary optical system 111 is removed, the working distance is decreased, and the objective lens 108 is focused at a position separated from the tip thereof by the working distance $WD_2$. Therefore, by moving the slider 106 up and down by a distance equal to the change in working distance, $Z_{WD} = WD_1 - WD_2$, due to the insertion and removal of the auxiliary optical system 111, to move the microscope optical system 103 in the optical axis direction thereof, it is possible to focus the system in each imaging state.

In this embodiment, the handle 107 is provided so that it can rotate about a fulcrum 107a fixed to the support stand 105. In addition, the handle 107 is attached so that it can rotate relative to the slider 106 and a frame 111a of the auxiliary optical system 111. Elongated holes 107b and 107c are provided on the handle 107, and pins 106a and 111b which are inserted into the elongated holes 107b and 107c are provided on the slider 106 and the frame 111a.

Accordingly, when an external force is exerted on the end of the handle 107, the handle 107 is rotated about the fulcrum 107a. By doing so, the pins 106a and 111b slide inside the elongated holes 107b and 107c provided on the handle 107, and the rotary motion of the handle 107 is converted to translational motion of the slider 106 and the frame 111a. As a result, as the slider 106 moves up and down, the auxiliary optical system 111 advances and retracts in a direction intersecting the optical axis, thus being inserted in and removed from the light path. In other words, by operating the handle 107, it is possible to interlock the up and down motion of the slider 106 with the insertion and removal of the auxiliary optical system 111 into and from the light path.

Stoppers 112a and 112b which abut against the slider 106 at the ends of the movement range of the slider 106 are provided on the support stand 105. The distance moved by the slider 106, which is restricted by the stoppers 112a and 112b, is set to match the change in working distance $Z_{WD}$ described above.

In FIG. 32, reference numeral 113 is a knob for moving the stage 102 up and down.

A microscope observation method using the microscope apparatus 101 according to this embodiment, configured in this way, will be described next.

To carry out in vivo examination of the interior of the small laboratory animal serving as the specimen A using the microscope apparatus 101 according to this embodiment, an incision is made, for example, in the abdomen of the specimen A mounted on the stage 102, and the narrow-diameter end portion 108a of the objective lens 108 is inserted through the incision. At this stage, air is supplied via the incision to keep the abdominal cavity inflated.

Next, by operating the handle 107, the auxiliary optical system 111 is inserted into the light path between the objective lens 108 and the image-forming lens 109, and a light source (not shown in the drawing) is operated to illuminate the interior of the abdominal cavity. At this time, the slider 106 moves up in conjunction with the insertion of the auxiliary optical system 111 and abuts against the top stopper 112a, whereupon the microscope optical system 103 is disposed in the raised position.

In this state, the stage 102 is raised or lowered by adjusting the knob 113 to locate the objective lens 108 at the focal position. In wide-field observation, the working distance of the objective lens 108 is long. Thus, by disposing the slider 106 in the raised position, the tip of the objective lens 108 and the specimen A become farther apart, and the working distance $WD_1$ is ensured. Therefore, wide-field observation is a "dry" observation method in which a space is formed between the tip of the objective lens 108 and the specimen A.

Reflected light of the illumination light from the light source, which is reflected at the surface of the examination site B, is collected by the objective lens 108, passes through the auxiliary optical system 111 and the image-forming lens 109, and is incident on the image-acquisition device 110.

When the object-side focal plane of the microscope optical system 103 is coincident with the surface of the examination site B, such as an internal organ, an image of the examination site B is formed at the image-acquisition surface 110a of the image-acquisition device 110. Thus, it is possible to obtain a wide-field observed image of the examination site B, with a bright field.

Next, the handle 107 is operated to remove the auxiliary optical system 111 from the light path between the objective lens 108 and the image-forming lens 109. At this time, the slider 106 is lowered in conjunction with the removal of the auxiliary optical system 111 and abuts against the bottom stopper 112b. Thus, the microscope optical system 103 is disposed in the lowered position, and the tip of the objective lens 108 is close to the surface of the examination site B, such as an internal organ.

In magnified observation, the working distance of the objective lens 108 is short. By lowering the slider 106, the tip of the objective lens 108 and the specimen A approach each other, and the working distance $WD_2$ is achieved. At this time, because the space between the tip of the objective lens 108 and the specimen A is filled with a liquid, for example, this magnified observation is a liquid immersion observation method.

Accordingly, when the object-side focal plane of the microscope optical system 103 is coincident with the surface of the examination site B, an image of the examination site B is formed at the image-acquisition surface 110a of the image-acquisition device 110, and it is possible to obtain a magnified observed image of the examination site B.

With the microscope apparatus 101 according to this embodiment, the image-forming relationship is changed merely by inserting and removing the auxiliary optical system 111, having positive power, in the light path between the objective lens 108 and the image-forming lens 109, and it is thus possible to carry out two observation methods with different magnifications, namely, wide-field observation and magnified observation. In this case, according to this embodiment, because the magnification is changed without replacing the objective lens 108, it is possible to change the observation method while keeping the narrow-diameter end portion 108a of the objective lens 108 in the incision made in the small laboratory animal serving as the specimen A. Therefore, with the microscope apparatus 101 according to this embodiment, it is possible to change the magnification and perform magnified observation while keeping a target site that is identified in wide-field observation set at the center of the image.

The microscope apparatus 101 according to this embodiment changes the magnification by changing the image-forming relationship. Therefore, with the microscope apparatus 101 according to this embodiment, it is possible to ensure high-magnification during magnified observation and a wide field of view during wide-field observation, even though the diameter of the objective lens 108 is reduced compared with a system involving insertion and removal of a magnifying optical system after the objective lens 108, as used in the related art. Therefore, with the microscope apparatus 101 according to this embodiment, it is possible to reduce the size of the incision made in the specimen A, which minimizes the invasiveness to and reduces the burden placed on the specimen A, thus affording an advantage in that it is possible to carry out in vivo examination of the specimen A while keeping it in near-natural conditions.

Furthermore, with the microscope apparatus 101 according to this embodiment, the slider 106 and the frame 111a of the auxiliary optical system 111 are interlocked by the operation of the handle 107, which simultaneously achieves a working distance matching the switching of the observation method. Therefore, with the microscope apparatus 101 according to this embodiment, a complicated operation for switching the observation method is eliminated, which affords an advantage in that it is possible to improve the operability.

Next, a microscope apparatus 120 according to a seventh embodiment of the present invention will be described with reference to FIGS. 36 to 38.

In the description of this embodiment, parts having the same configuration as those in the microscope apparatus 101 according to the sixth embodiment described above are assigned the same reference numerals, and a description thereof will be omitted here.

Figures 36, 37, 38:
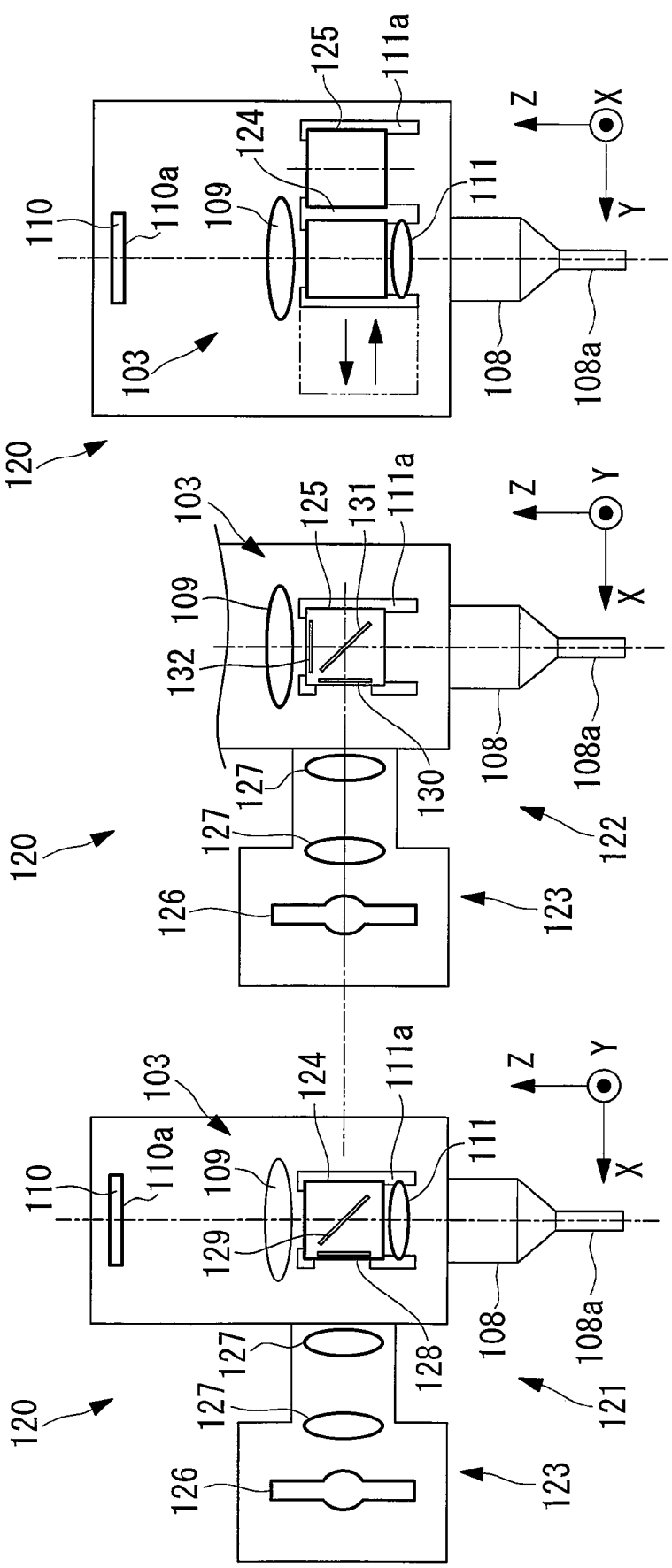
FIG. 36 is a partial front elevational view of a microscope apparatus according to a seventh embodiment of the present invention during wide-field observation.
FIG. 37 is a partial front elevational view of the microscope apparatus according to the seventh embodiment of the present invention during magnified observation.
FIG. 38 is a partial side view of the microscope apparatus according to the seventh embodiment of the present invention during wide-field observation.

FIG. 36 is a partial front elevational view showing a portion of the microscope apparatus 120 according to this embodiment during wide-field observation, FIG. 37 is a front elevational view of the same during magnified observation, and FIG. 38 is a side view of the same during wide-field observation. The handle 107 is omitted from these drawings.

The microscope apparatus 120 according to this embodiment differs from the microscope apparatus 101 according to the sixth embodiment in that it includes two different illumination apparatuses 121 and 122 and that it switches between the illumination apparatuses 121 and 222, in conjunction with the movement of the slider 106 and the auxiliary optical system 111, by means of the operation of the handle 107.

As shown in FIGS. 36 and 37, the two illumination apparatuses 121 and 122 are formed of a shared light source unit 123 and two filter units 124 and 125. As shown in FIG. 38, the two filter units 124 and 125 are secured to the frame 111a of the auxiliary optical system 111 so as to be adjacent to each other in the direction of motion of the auxiliary optical system 111, and are switched together with the insertion and removal of the auxiliary optical system 111 into and from the light path.

The light source unit 123 is formed of a mercury vapor lamp 126, which generates white light including ultraviolet light, and a condenser lens 127.

The first filter unit 124 includes a UV cutting filter 128, which blocks the ultraviolet light in the white light emitted from the mercury vapor lamp 126, and a beamsplitter 129.

A portion of the light other than the ultraviolet light blocked by the UV cutting filter 128 from among the white light emitted from the mercury vapor lamp 126 is reflected by the beamsplitter 129, passes through the objective lens 108, and irradiates the specimen A. On the other hand, after being collected by the objective lens 108, a portion of the reflected light that is reflected at the specimen A is transmitted through the beamsplitter 129, is converged by the image-forming lens 109, and is acquired by the image-acquisition device 110. The first filter unit 124, which is disposed in series with the auxiliary optical system 111 in the optical axis direction, is inserted into the light path at the same time as the auxiliary optical system 111 is inserted into the light path.

The second filter unit 125 includes an excitation filter 130 for extracting excitation light from the white light emitted from the mercury vapor lamp 126, a dichroic mirror 131 for reflecting the excitation light extracted by the excitation filter 130 and for transmitting incident fluorescence from the specimen A, and a barrier filter 132 for blocking the excitation light transmitted through the dichroic mirror 131. The second filter unit 125 is inserted into the light path instead of the first filter unit 124 when the auxiliary optical system 111 and the first filter unit 124 are removed from the light path.

The operation of the microscope apparatus 120 according to this embodiment, configured in this way, will be described next.

To perform wide-field observation of the specimen A using the microscope apparatus 120 according to this embodiment, the auxiliary optical system 111 and the first filter unit 124 are inserted into the light path by operating the handle 107. At the same time, the slider 106 is moved upward to ensure a large gap between the specimen A and the objective lens 108. The illumination apparatus 121 is formed by inserting the first filter unit 124 into the light path. Then, the stage 102 is raised by operating the knob 113 to bring the examination site B of the specimen A into coincidence with the object-side focal plane of the objective lens 108.

In this state, when white light is incident on the first filter unit 124 from the light source unit 123, the white light remaining after removing the ultraviolet light with the UV cutting filter 128 is reflected by the beamsplitter 129. This reflected white light passes through the auxiliary optical system 111 and the objective lens 108, and irradiates the specimen A. Then, reflected light from the specimen A is collected by the objective lens 108. The collected reflected light is transmitted through the auxiliary optical system 111 and the beamsplitter 129, is converged by the image-forming lens 109, and is acquired by the image-acquisition device 110. Accordingly, it is possible to perform bright-field wide-field observation using white light. Because a space is formed between the objective lens 108 and the specimen A, the wide-field observation is a dry observation method.

On the other hand, to perform magnified observation of the specimen A using the microscope apparatus 120 according to this embodiment, by operating the handle 107, the auxiliary optical system 111 and the first filter unit 124 are removed from the light path, and the second filter unit 125 is inserted into the light path instead. The illumination apparatus 122 is formed by inserting the second filter unit 125 in the light path. At this time, because the slider 106 is lowered in conjunction with the insertion and removal of the filter units 124 and 125 by operating the handle 107, the tip of the objective lens 108 is brought closer to the specimen A. Accordingly, a short working distance is achieved, and the examination site B of the specimen A is brought into coincidence with the object-side focal plane of the objective lens 108.

In this state, when the white light is incident on the second filter unit 125 from the light source unit 123, the excitation light extracted by the excitation filter 130 is reflected by the dichroic mirror 131, passes through the objective lens 108, and irradiates the specimen A. By irradiating the specimen A with the excitation light, a fluorescent material contained in the specimen A is excited and emits fluorescence. The emitted fluorescence is collected by the objective lens 108, is transmitted through the dichroic mirror 131 and the barrier filter 132, is converged by the image-forming lens 109, and is acquired by the image-acquisition device 110. Accordingly, it is possible to perform magnified observation with fluorescence. Because the tip of the objective lens 108 is brought so close to the specimen A as to be almost in contact therewith, liquid such as bodily fluid is present between the two. Therefore, the fluorescence magnified observation is a liquid-immersion observation method.

With the microscope apparatus 120 according to this embodiment, the two observation methods are switched merely by operating the handle 107; in addition, it is possible to achieve a working distance suitable for each observation method, and it is possible to switch between the illumination apparatuses 121 and 122, whichever is more suitable for each observation method. Therefore, an advantage is afforded in that it is possible to further improve the operability.

In this embodiment, the system switches between fluorescence illumination and white-light illumination for bright-field observation, both of which are coaxial incidence setups. Instead of this, however, as shown in FIGS. 39 to 45, it is also possible to switch to direct illumination using white light from outside the objective lens 108 during wide-field observation, and to coaxial-incidence fluorescence illumination during magnified observation.

FIG. 39 is a partial plan view showing a portion of a microscope apparatus 120' during wide-field observation, FIG. 40 is a front elevational view of the same, FIG. 41 is a plan view of the same during magnified observation, and FIG. 43 is a side view of the same during wide-field observation. The handle 107 is omitted from these drawings.

Figure 44:
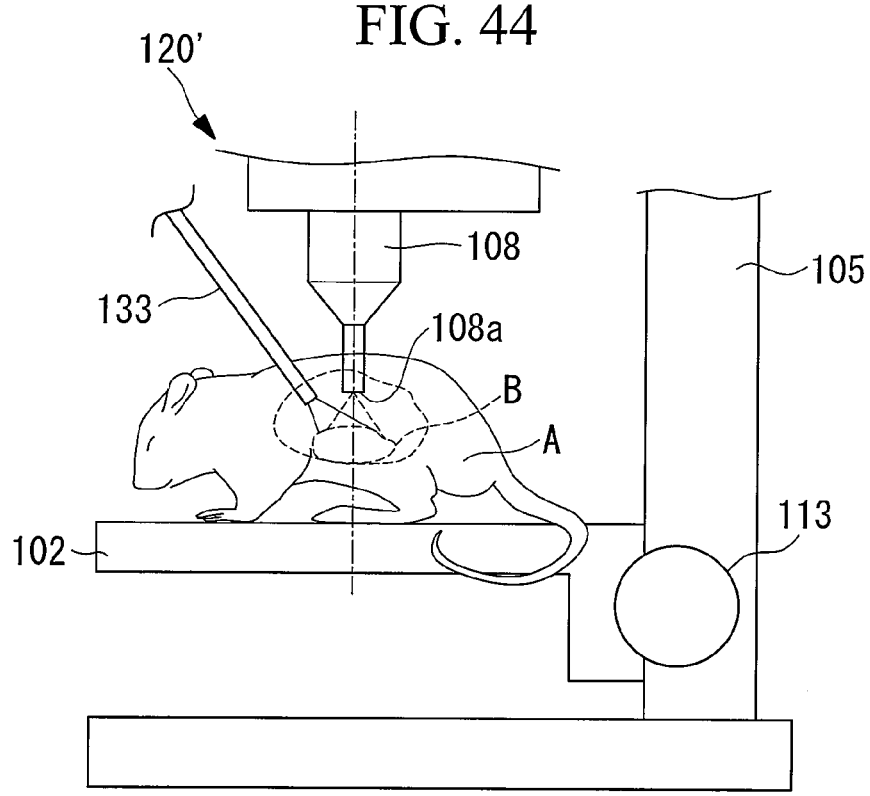
FIG. 44 is a partial front elevational view for explaining illumination switching in the microscope apparatus in FIG. 39, showing direct illumination during wide-field observation.
Figure 45:
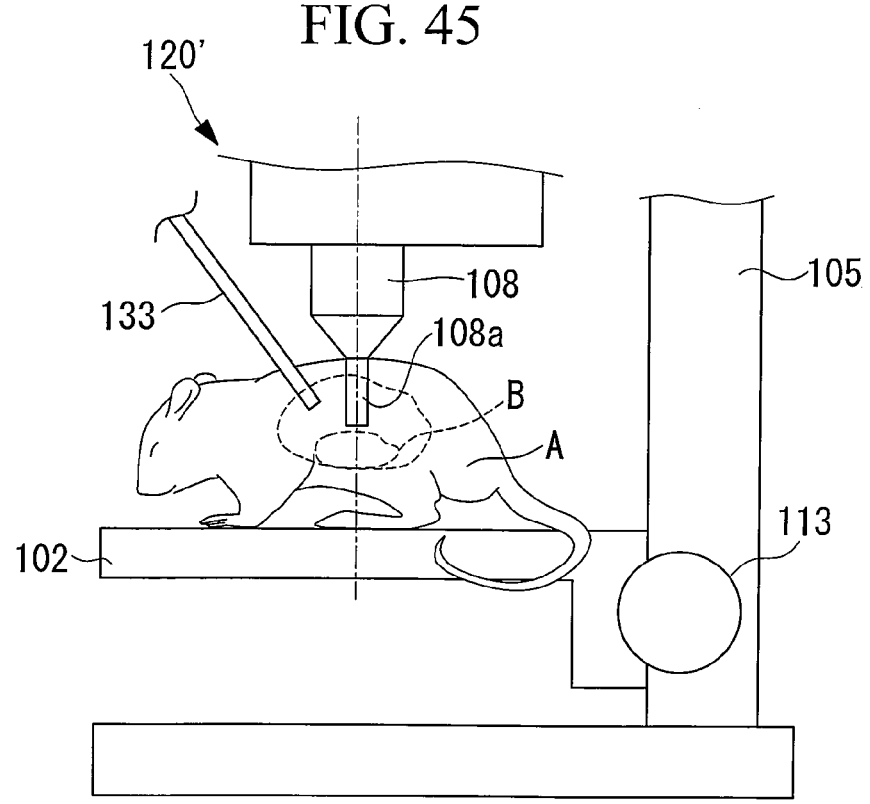
FIG. 45 is a partial front elevational view for explaining illumination switching in the microscope apparatus in FIG. 39 showing coaxial-incidence illumination during magnified observation.

FIG. 44 is a partial front elevational view showing direct illumination with a fiber bundle 133 during wide-field observation, and FIG. 45 is a partial front elevational view showing coaxial-incidence fluorescence illumination during magnified observation.

In this case, on the frame 111a of the auxiliary optical system 111, an end face of the fiber bundle 133 and the objective lens 108 are disposed side-by-side in the direction of incidence of the white light from the light source unit 123. On the frame 111a, when the auxiliary optical system 111 is disposed on the optical axis of the objective lens 108, a first filter unit 124' is positioned on the optical axis of the fiber bundle 133. The first filter unit 124' includes a mirror 129' instead of the beamsplitter 129.

On the frame 111a, when the auxiliary optical system 111 is removed from the optical axis of the objective lens 108, the second filter unit 125 is instead disposed at a position where it is located on the same optical axis. Reference numeral 134 in the drawing is a coupling lens for focusing the illumination light at the end face of the fiber bundle 133.

By doing so, it is possible to reduce the loss of the illumination light during wide-field observation, thus allowing bright illumination.

Next, a microscope apparatus 140 according to an eighth embodiment of the present invention will be described with reference to FIG. 46.

In the description of this embodiment, parts having the same configuration as those of the microscope apparatus 101 according to the sixth embodiment described above are assigned the same reference numerals, and a description thereof will be omitted here.

The microscope apparatus 140 according to this embodiment differs from the microscope apparatus 101 according to the sixth embodiment in that two detection devices 141 and 142 are provided, and the detection devices 141 and 142 are switched between in conjunction with the switching of the observation method.

Figure 46:
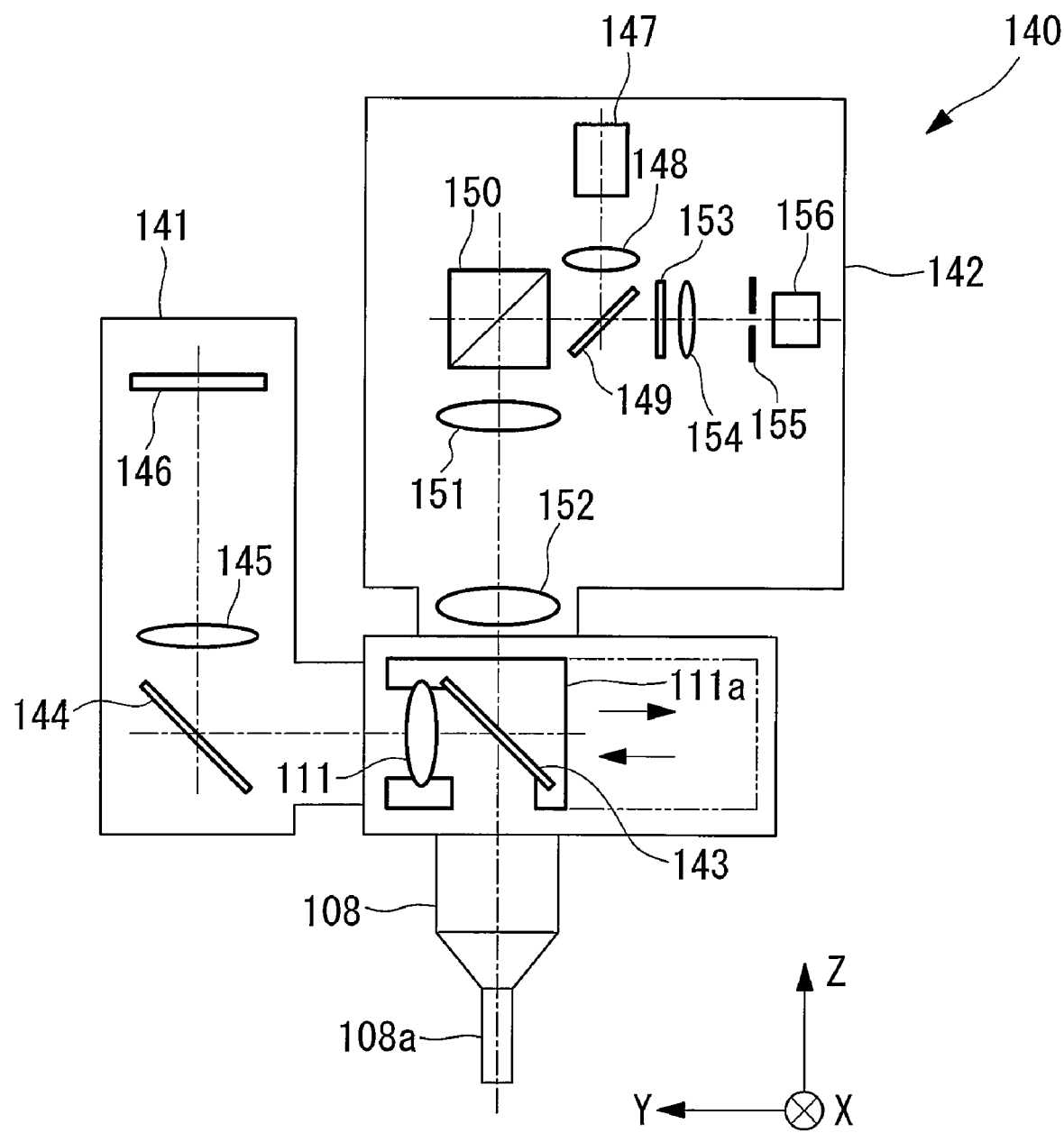
FIG. 46 is a partial front elevational view showing, in outline, a microscope apparatus according to an eighth embodiment of the present invention during wide-field observation.

As shown in FIG. 46, the first detection device 141 includes a mirror 143 and the auxiliary optical system 111, which are secured to the frame 111a, and a deflecting mirror 144, an image-forming lens 145, and a solid-state image-acquisition device 146, such as a CCD, for acquiring reflected light converged by the image-forming lens 145.

During wide-field observation, by moving the frame 111a to position the mirror 143 in the light path, the reflected light from the specimen A, which is collected by the objective lens 108, is acquired by the solid-state image-acquisition device 146. The illumination light source used during wide-field observation is omitted from the drawing. At this time, the light path to the second detection device 142, which is described later, is obstructed by the mirror 143.

The second detection device 142 includes a laser light source 147 for emitting laser light, a collimator lens 148 for converting the laser light from the laser light source 147 to substantially collimated light, a dichroic mirror 149 for reflecting the substantially collimated laser light, a galvanometer mirror 150 for two dimensionally scanning the laser light, a pupil-relaying lens 151 for focusing the laser light scanned by the galvanometer mirror 150, and an image-forming lens 152 for converting the laser light focused by the pupil-relaying lens 151 to substantially collimated light. The second detection device 142 also includes a barrier filter 153 for transmitting fluorescence from the specimen after it is collected by the objective lens 108, returns along the same light path via the image-forming lens 152, the pupil-relaying lens 151, and the galvanometer mirror 150, and passes through the dichroic mirror 149, as well as for blocking the laser light; a focusing lens 154 for focusing the fluorescence passing through the barrier filter 153; a confocal pinhole 155 which passes the focused fluorescence; and a light detector 156 for detecting the fluorescence passing through the confocal pinhole 155.

When using the microscope apparatus 140 according to this embodiment, having such a configuration, to perform wide-field observation, the first detection device 141 is selected by operating the handle 107 (not shown) to position the mirror 143 on the optical axis. Accordingly, the auxiliary optical system 111 is located in the light path folded by the mirror 143, the observation method is switched to wide-field observation, and the slider 106 (not shown) is raised to secure sufficient working distance.

By doing so, reflected light from the examination site B on the specimen A, which is collected by the objective lens 108, is reflected by the mirror 143, is focused by the auxiliary optical system 111, and is acquired by the solid-state image-acquisition device 146, via a deflecting mirror 144 and the image-forming lens 145. Thus, it is possible to acquire a wide-field observed image.

On the other hand, when performing magnified observation, the second detection device 142 is selected by operating the handle 107 to remove the mirror 143 and the auxiliary optical system 111 from the light path. The slider 106 is lowered in conjunction with this operation to achieve a shorter working distance and to switch the observation method to magnified observation.

The laser light emitted from the laser light source 147 travels along a path via the collimator lens 148 and the dichroic mirror 149, is two-dimensionally scanned by the galvanometer mirror 150, passes through the pupil relaying lens 151 and the image-forming lens 152, and is incident on the objective lens 108 as a substantially collimated beam. The fluorescence generated in the examination site B of the specimen A is collected by the objective lens 108, returns via the image-forming lens 152, the pupil-relaying lens 151, the galvanometer mirror 150, and the dichroic mirror 149, and laser light is removed therefrom by the barrier filter 153. Then, the fluorescence from which the laser light is removed is focused by the focusing lens 154, and only the part passing through the confocal pinhole 155 is detected by the light detector 156. By sequentially storing, at each point in time, the scanning position of the laser light by the galvanometer mirror 150 and fluorescence intensity information detected by the light detector 156, it is possible to acquire a confocal fluorescence image of the examination site B.

Thus, with the microscope apparatus 140 according to this embodiment, merely by operating the handle 107, it is possible to switch between wide-field observation and magnified observation while ensuring a working distance suitable for each observation method. In addition, it is possible to switch between the detection devices 141 and 142, whichever is best suited for each observation method. Therefore, it is possible to further improve the operability, which affords an advantage in that it is possible to configure the system as a confocal microscope during magnified observation, which allows extremely weak fluorescence to be detected and a clear fluorescence image to be acquired.

What is claimed is:

1. A microscope optical system comprising:
an objective lens configured to collimate light from an examination site;
an image-forming lens configured to image the light collimated by the objective lens on a detection device; and
an auxiliary optical system having positive power, which is provided in a collimated light path between the objective lens and the image-forming lens in such a manner as to be capable of being inserted and removed,
the microscope optical system further comprising a Galilean afocal optical system that is inserted in and removed from the collimated light path to change places with the auxiliary optical system when the auxiliary optical system is inserted in and removed from the light path between the objective lens and the image-forming lens.

2. A microscope optical system comprising:
an objective lens configured to collimate light from an examination site;
an image forming lens configured to image the light collimated by the objective lens on a detection device; and
an auxiliary optical system having positive power, which is provided in a collimated light path between the objective lens and the image-forming lens in such a manner as to be capable of being inserted and removed,
the microscope optical system further comprising a Keppler afocal optical system that is inserted in and removed from the collimated light path to change places with the auxiliary optical system when the auxiliary optical system is inserted in and removed from the light path between the objective lens and the image-forming lens.

3. A microscope optical system comprising:
an objective lens configured to collimate light from an examination site;
an image-forming lens configured to image the light collimated by the objective lens on a detection device; and
an auxiliary optical system having positive power, which is provided in a collimated light path between the objective lens and the image-forming lens in such a manner as to be capable of being inserted and removed,
the microscope optical system further comprising a reverse-Galilean afocal optical system that is inserted in and removed from the collimated light path between the objective lens and the image-forming lens together with the auxiliary optical system.

4. A microscope optical system comprising:

an objective lens configured to collimate light from an examination site;

an image-forming lens configured to image the light collimated by the objective lens on a detection device; and an auxiliary optical system having positive power, which is provided in a collimated light path between the objective lens and the image-forming lens in such a manner as to be capable of being inserted and removed, wherein the auxiliary optical system is configured so as to satisfy the following conditional expression:

$$0.0108 \text{ (mm)} \leq [F_{OB'}\text{-}F_{SUB}] \leq 675 \text{ (mm)}$$

where $[F_{OB'}\text{-}F_{SUB}]$ is a distance between $F_{OB'}$ and $F_{SUB}$, where $F_{OB'}$ is an image-side focal point of the objective lens, and $F_{SUB}$ is an object-side focal point of the auxiliary optical system.

* * * * *